United States Patent
Jung et al.

(10) Patent No.: US 9,213,201 B2
(45) Date of Patent: Dec. 15, 2015

(54) DISPLAY PANEL AND METHOD OF MANUFACTURING THE SAME

(75) Inventors: Young-Min Jung, Asan-si (KR);
Sang-Yeoul Lim, Suwon-si (KR);
Kweon-Sam Hong, Seoul (KR);
Hong-Joon Moon, Cheonan-si (KR);
You-Hyun Jeong, Cheonan-si (KP);
Sang-Ho Kim, Cheonan-si (KR);
Ho-Jun Lee, Anyang-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 645 days.

(21) Appl. No.: 13/157,374

(22) Filed: Jun. 10, 2011

(65) Prior Publication Data
US 2012/0194494 A1 Aug. 2, 2012

(30) Foreign Application Priority Data

Jan. 31, 2011 (KR) ........................ 10-2011-0009426

(51) Int. Cl.
*G02F 1/1339* (2006.01)
*G02F 1/1337* (2006.01)
*G02F 1/1341* (2006.01)

(52) U.S. Cl.
CPC ........ *G02F 1/133723* (2013.01); *G02F 1/1341* (2013.01); *G02F 1/1337* (2013.01); *G02F 1/1339* (2013.01); *G02F 2001/13415* (2013.01)

(58) Field of Classification Search
CPC .................................................... G02F 1/1337
USPC ........................................................ 349/153
See application file for complete search history.

(56) References Cited

U.S. PATENT DOCUMENTS

| | | | |
|---|---|---|---|
| 5,880,803 A * | 3/1999 | Tamai et al. | 349/156 |
| 5,917,572 A * | 6/1999 | Kurauchi et al. | 349/156 |
| 7,646,458 B2 | 1/2010 | Onda | |
| 2003/0025868 A1* | 2/2003 | Hiroshima et al. | 349/156 |
| 2005/0117093 A1* | 6/2005 | Kim et al. | 349/106 |
| 2009/0009698 A1* | 1/2009 | Moon et al. | 349/106 |
| 2009/0066242 A1* | 3/2009 | Koo | 313/506 |
| 2009/0115947 A1* | 5/2009 | Huang et al. | 349/106 |
| 2010/0014042 A1* | 1/2010 | Komeno et al. | 349/153 |
| 2010/0119971 A1* | 5/2010 | Kim et al. | 430/270.1 |
| 2010/0134710 A1* | 6/2010 | Ishitani et al. | 349/46 |
| 2010/0134746 A1* | 6/2010 | Tashiro et al. | 349/153 |

FOREIGN PATENT DOCUMENTS

| | | |
|---|---|---|
| KR | 10-0473588 | 2/2005 |
| KR | 1020070061977 A | 6/2007 |

* cited by examiner

*Primary Examiner* — Nathanael R. Briggs
*Assistant Examiner* — Alexander Gross
(74) *Attorney, Agent, or Firm* — Cantor Colburn LLP

(57) ABSTRACT

In a display panel and a method of manufacturing the same, the display panel includes a first display substrate, a second display substrate and a sealing member. The first display substrate includes a first alignment layer in a first display region and a first peripheral region of a first base substrate, and a first backflow-blocking pattern in the first peripheral region and having a curvature to surround a vertex portion of the first display region. The second display substrate includes a second alignment layer in a second display region which faces the first display region and a second peripheral region of a second base substrate. The sealing member includes a corner portion having substantially the same curvature as the first backflow-blocking pattern to surround an outline of the first and second peripheral regions.

25 Claims, 13 Drawing Sheets

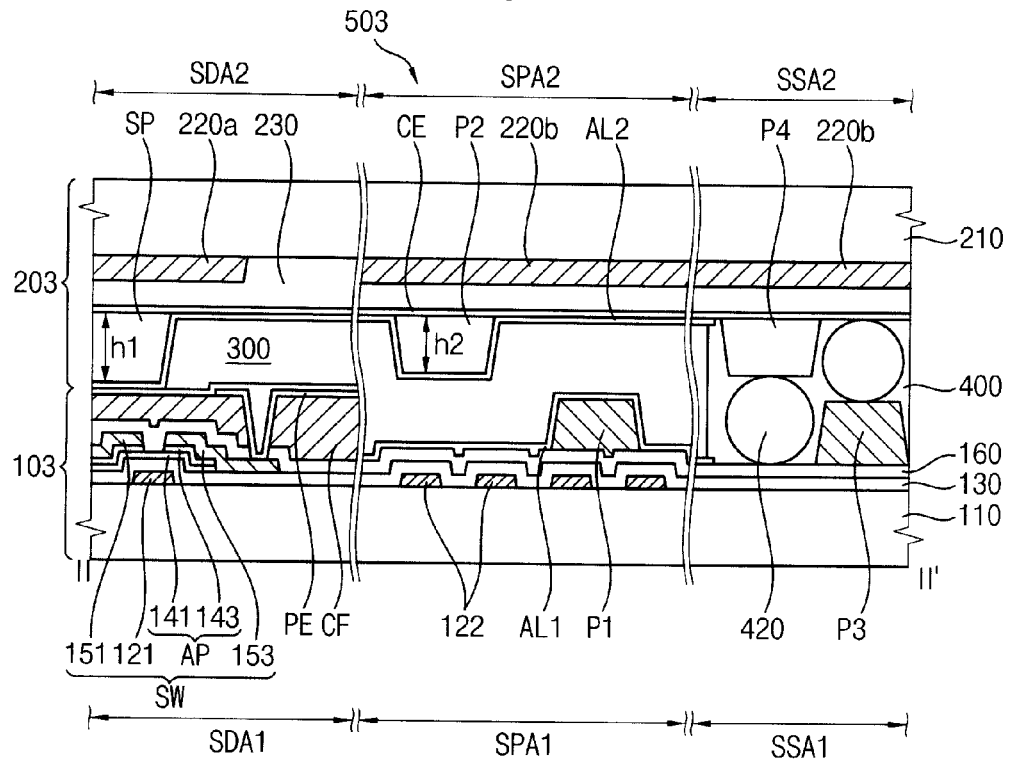
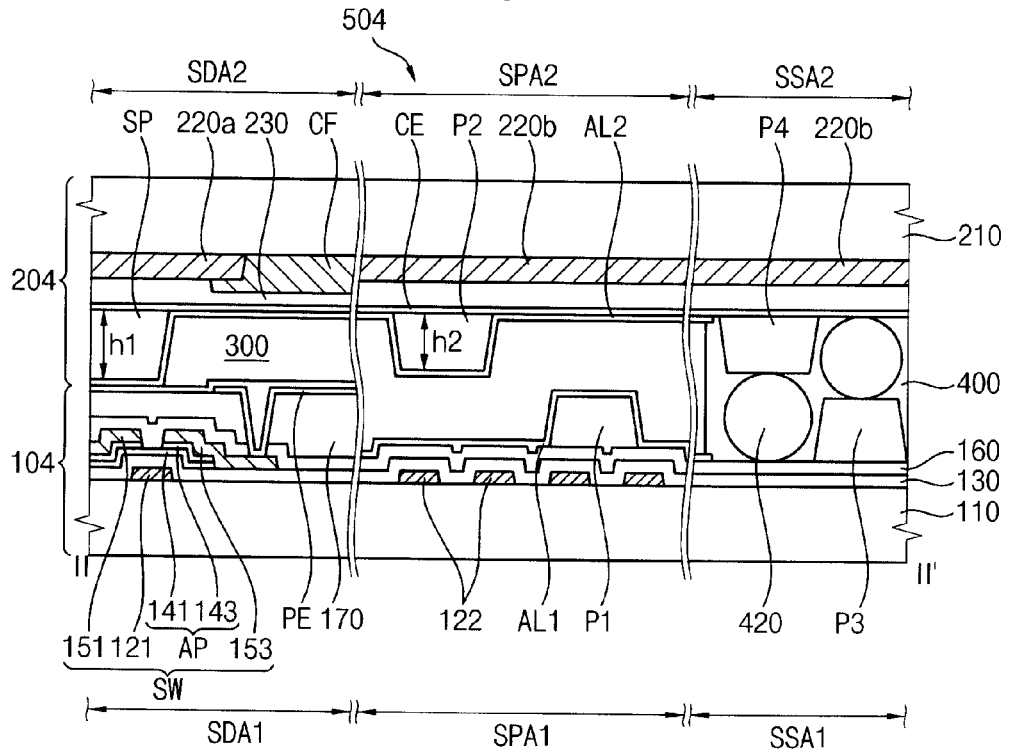

DISPLAY PANEL AND METHOD OF MANUFACTURING THE SAME

This application claims priority to Korean Patent Application No. 2011-0009426, filed on Jan. 31, 2011, and all the benefits accruing therefrom under 35 U.S.C. §119, the contents of which are herein incorporated by reference in their entireties.

BACKGROUND OF THE INVENTION

1. Field of the Invention

Exemplary embodiments of the invention relate to a display panel and a method of manufacturing the display panel. More particularly, exemplary embodiments of the invention relate to a display panel used for a liquid crystal display ("LCD") apparatus and a method of manufacturing the display panel.

2. Description of the Related Art

Generally, an LCD panel includes a first display substrate including a thin-film transistor ("TFT") for driving a pixel, a second display substrate facing the first display substrate, and a liquid crystal layer interposed between the first and second display substrates. A voltage is applied to the liquid crystal layer to control light transmittance so that the LCD panel displays an image. An alignment layer is formed on each of the first and second display substrates in order to adjust an initial alignment of liquid crystal molecules of the liquid crystal layer. The liquid crystal molecules are interposed between the alignment layers facing each other.

A material used for the alignment layer generally includes a polyamic acid based compound for improving strength of the alignment layer or a polyimide based compound having a high voltage holding rate. These may be used alone or a combination thereof. The alignment layer is formed via coating a raw material of the alignment layer using an ink jetting process or a rolling process on a substrate. Alternatively, the alignment layer may be formed via additionally rubbing a surface of the coated raw material on the substrate.

However, when the alignment layer is formed on each of the first and second display substrates of the LCD panel having a quadrilateral shape when viewed in a plane, a repulsive force between a raw material layer and patterns formed under the raw material layer is generated by a chemical characteristic of the raw material although the raw material is uniformly coated on each of the first and second display substrates. Thus, corner portions of the raw material layer are rolled toward an inside of each of the first and second display substrates. Accordingly, the alignment layer is not uniformly formed on each of the first and second display substrates. The alignment layer is not formed on a region in which the raw material layer is not formed, and thus the liquid crystal molecules may not be controlled in the region to decrease a display quality.

BRIEF SUMMARY OF THE INVENTION

Exemplary embodiments of the invention provide a display panel capable of improving reliability of an alignment layer.

Exemplary embodiments of the invention also provide a method of manufacturing the display panel.

According to an exemplary embodiment of the invention, the display panel includes a first display substrate, a second display substrate and a sealing member. The first display substrate includes a first base substrate including a first display region having a corner portion, and a first peripheral region, a first alignment layer in the first display region and the first peripheral region, a first backflow-blocking pattern in the first peripheral region and having a curvature such that the first backflow-blocking pattern surrounds the corner portion of the first display region. The second display substrate includes a second base substrate including a second display region which faces the first display region and has a corner portion, and a second peripheral region, a second alignment layer in the second display region which faces the first display region and in the second peripheral region. The sealing member includes a corner portion having substantially the same curvature as the first backflow-blocking pattern and surrounding an outline of the first and second peripheral regions.

In an exemplary embodiment, the second display substrate may further include a second backflow-blocking pattern in the second peripheral region and having substantially the same curvature as the sealing member such that the second backflow-blocking pattern surrounds the corner portion of the second display region. The second backflow-blocking pattern may be spaced apart from the first backflow-blocking pattern by a predetermined distance.

In an exemplary embodiment, the first display substrate may further include a pixel spacer in the first display region. The pixel spacer may maintain a gap between the first and second display substrates, and be between the first base substrate and the first alignment layer. The first backflow-blocking pattern may be in substantially the same layer as the pixel spacer, and be between the first base substrate and the first alignment layer.

In an exemplary embodiment, the first display substrate may further include a light-blocking including a matrix portion and an outer portion. The matrix portion may be in the first display region, and the outer portion may be connected to the matrix portion and be in the first peripheral region. The first backflow-blocking pattern and the outer portion form a single unitary indivisible member.

In an exemplary embodiment, the first display substrate may further include a color filter in the first display region, and the first backflow-blocking pattern may be in substantially the same layer as the color filter.

In an exemplary embodiment, the first display substrate may further include a pixel electrode in the first display region, a switching element electrically connected to the pixel electrode, and an organic insulating layer between the pixel electrode and the switching element. The first backflow-blocking pattern may be in substantially the same layer as the organic insulating layer.

In an exemplary embodiment, the first base substrate may further include a first seal line region. The first display substrate may further include a first spread-blocking pattern formed in the first seal line region which corresponds to the corner portion of the sealing member. The first spread-blocking pattern may have substantially the same curvature as the first backflow-blocking pattern.

According to another exemplary embodiment of the invention, there is provided a method of manufacturing the display panel. In the method, a first display substrate is manufactured. The first display substrate includes a base substrate including a display region having a corner portion, a peripheral region, and a seal line region which surrounds the peripheral region, an alignment layer on the base substrate. The backflow-blocking pattern is formed in the peripheral region of the base substrate and has a curvature to surround the corner portion of the display region. The alignment layer is formed in the display region and the peripheral region. A sealing member is formed on the first display substrate. The sealing member is disposed in the seal line region surrounding the peripheral region and has substantially the same curvature as the backflow-blocking pattern. The first display substrate is assembled with a second display substrate after the forming the sealing member, to manufacture the display panel.

According to further another exemplary embodiment of the invention, the display panel includes a first display substrate, a second display substrate, and a sealing member. The first display substrate includes a first base substrate, a first alignment layer and a first backflow-blocking pattern. The first base substrate includes a first display region having a corner portion and a first peripheral region. The first alignment layer is in the first display region and the first peripheral region. The first backflow-blocking pattern is in the first peripheral region and has a curvature such that the first backflow-blocking pattern surrounds the corner portion of the first display region. The second display substrate faces the first display substrate and includes a second base substrate and a second alignment layer. The second base substrate includes a second display region which faces the first display region and has a corner portion, and a second peripheral region. The second alignment layer is in the second display region and the second peripheral region. The sealing member is between the first and second display substrates, and the sealing member includes a corner portion having a curvature different from the first backflow-blocking pattern, and surrounds an outline of each of the first and second peripheral regions.

In an exemplary embodiment, the curvature of the corner portion may be larger than that of the first backflow-blocking pattern.

In an exemplary embodiment, the second display substrate may further include a second backflow-blocking pattern in the second peripheral region having a curvature different from the sealing member such that the second backflow-blocking pattern surrounds the corner portion of the second display region.

In an exemplary embodiment, the curvature of the second backflow-blocking pattern may be substantially the same as that of the first backflow-blocking pattern.

According to the exemplary embodiments, the backflow-blocking pattern is formed in a peripheral region of at least one of two display substrates of the display panel to reduce or effectively prevent an end portion of the alignment layer, particularly in the corner region of the display substrate, from rolling toward the display region during forming of the alignment layer. The backflow-blocking pattern is simultaneously formed in forming a pixel pattern of a pixel in the display region so that the number of manufacturing processes for the display panel may not be increased.

In addition, the spread-blocking pattern is additionally formed in a seal line region in which a sealing member is formed, so that the spread-blocking pattern may reduce or effectively prevent the alignment layer from spreading to the seal line region. When the alignment layer is formed in the seal line region, the coherence between the two display substrates is decreased because an adhesive strength between the alignment layer and the sealing member is weak. However, the spread-blocking pattern may reduce or effectively prevent the alignment layer from spreading to the seal line region.

BRIEF DESCRIPTION OF THE DRAWINGS

The above and other features and advantages of the invention will become more apparent by describing in detailed exemplary embodiments thereof with reference to the accompanying drawings, in which:

FIG. 11 is a cross-sectional view taken along line II-II' in FIG. 10;

FIG. 12 is a cross-sectional view illustrating still another exemplary embodiment of a display panel according to the invention;

DETAILED DESCRIPTION OF THE INVENTION

Figure 1:
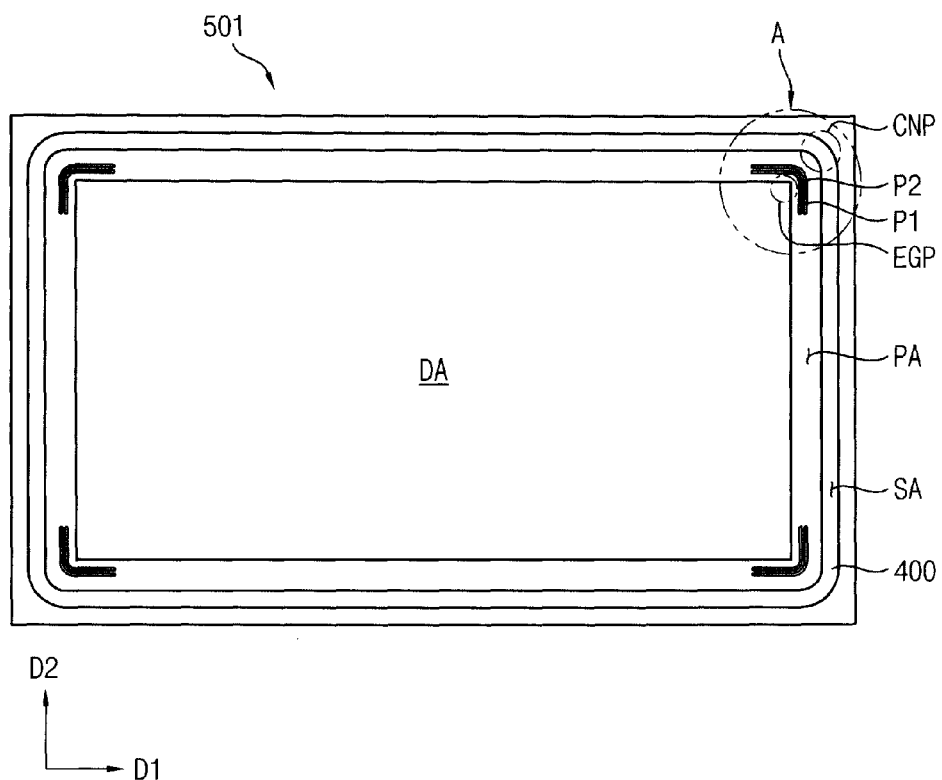
FIG. 1 is a plan view illustrating an exemplary embodiment of a display panel according to the invention.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
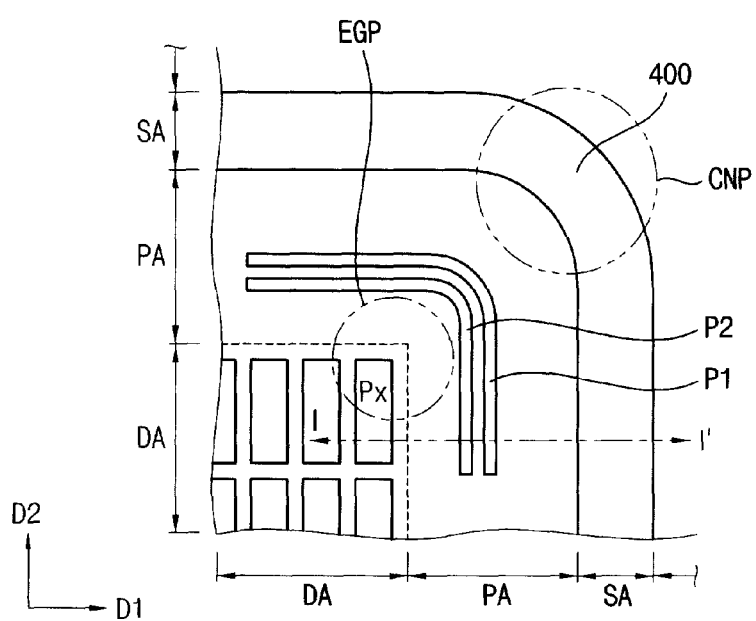
FIG. 2 is an enlarged plan view of portion "A" in FIG. 1.

FIG. 1 is a plan view illustrating an exemplary embodiment of a display panel according to an f the invention, and FIG. 2 is an enlarged plan view of portion "A" in FIG. 1.

Referring to FIGS. 1 and 2, a display panel 501 includes a display area DA, a peripheral area PA around the display area DA, first and second backflow-blocking patterns P1 and P2 in the peripheral area PA, a seal line forming area SA surrounding the peripheral area PA on an outside of the peripheral area PA, and a sealing member 400 in the seal line forming area SA.

The display panel 501 has a quadrilateral shape including four sides connected to each other. A point at which two sides of the four sides cross each other is defined as a vertex of the display panel 501. The display area DA and the display panel 501 may be similar figures. The display area DA has a quadrilateral shape. An outer portion of the display area DA corresponding to each of the vertexes of the display panel 501 is defined as a vertex portion EGP of the display area DA. The display panel 501 includes four vertex portions EGP.

The display area DA includes a plurality of pixels Px. The pixels Px are arranged in a first direction D1 of the display panel 501, and a second direction D2 different from the first direction D1, to have a matrix shape. The first direction D1 may be substantially perpendicular to the second direction D2. The pixels Px may include a pixel electrode PE (Refer to FIG. 3), a color filter CF (Refer to FIG. 3), a common electrode CE (Refer to FIG. 3) and a liquid crystal layer 300 (Refer to FIG. 3). Components of the pixels Px will be illustrated later referring to FIG. 3.

The peripheral area PA is an area of the display panel 501 surrounding the display area DA. The peripheral area PA may be divided to four sub areas. Points at which two sub areas different from each other of the four sub areas cross each other correspond to the vertex portions EGP of the display area DA, respectively.

Each of a plurality of the first backflow-blocking pattern P1 is disposed in a region adjacent to the vertex portion EGP of the peripheral area PA. The first backflow-blocking patterns P1 are respectively disposed at the four vertex portions EGP, respectively. The first backflow-blocking pattern P1 has a curvature to surround the vertex portion EGP. The first backflow-blocking pattern P1 is continuously disposed in the peripheral area PA. For example, the first backflow-blocking pattern P1 is disposed in a predetermined region of the peripheral area PA and has a shape of a continuous line (a full line) when viewed in a plan. The first backflow-blocking pattern P1 includes a first straight portion, a second straight portion and a connecting portion. The first straight portion extends along the first direction D1 of the display panel 501 and the second straight portion extends along the second direction D2. The connecting portion is disposed between the first and second straight portions and has a curved shape so that the first backflow-blocking pattern P1 surrounds the vertex portion EGP. The first straight portion, the second straight portion and the connection portion are connected with each other to be a united body, not separated from each other.

Each of a plurality of the second backflow-blocking patterns P2 is disposed substantially parallel with a first backflow-blocking pattern P1, and is spaced apart from the first backflow-blocking pattern P1 by a predetermined distance. Each of the second backflow-blocking patterns P2 is disposed in the peripheral area PA corresponding to the vertex portion EGP and surrounds the vertex portion EGP. The second backflow-blocking pattern P2 has substantially the same curvature as the first backflow-blocking pattern P1. The second backflow-blocking patterns P2 are continuously disposed in the peripheral area PA. For example, each of the second backflow-blocking patterns P2 is disposed in a predetermined region of the peripheral area and has a shape of a continuous line when viewed in a plan.

A portion corresponding to the vertex portion EGP of the second backflow-blocking pattern P2 is rounded to reduce or effectively prevent the sealing member 400 from overlapping with the second backflow-blocking pattern P2 in forming the sealing member 400. When the portion corresponding to the vertex portion EGP of the second backflow-blocking pattern P2 is a non-curved apex, the sealing member 400 may overlap with the second backflow-blocking pattern P2 in forming the sealing member 400. When the sealing member 400 overlaps with the second backflow-blocking pattern P2, a repulsive force between the sealing member 400 and the second backflow-blocking pattern P2 is generated so that the sealing member 400 may not be uniformly spread in the seal line forming area SA. The first backflow-blocking pattern P1 has a curvature so that an area in which the first backflow-blocking pattern P1 overlaps with the sealing member 400 is minimized.

The sealing member 400 is disposed in the seal line forming area SA. The seal line forming area SA is an area surrounding the peripheral area PA of the display panel 501. The sealing member 400 surrounds the peripheral area PA along the seal line forming area SA to have a looped curve in the plan view. The sealing member 400 straightly extends along the first direction D1 or the second direction D2 on the four sides of the display panel 501. A corner portion CNP of the sealing member 400 has a curvature to surround the peripheral area PA. The corner portion CNP is a portion of the sealing member 400 corresponding to the vertex portion EGP. The corner portion CNP has substantially the same curvature as the first backflow-blocking pattern P1. Alternatively, the corner portion CNP of the sealing member 400 may have a curvature different from the first backflow-blocking pattern P1 or the second backflow-blocking pattern P2. In one exemplary embodiment, the corner portion CNP may have a larger curvature than the first backflow-blocking pattern P1 or the second backflow-blocking pattern P2. When the corner portion CNP of the sealing member 400 may have a smaller curvature than the first backflow-blocking pattern P1 or the second backflow-blocking pattern P2, the sealing member 400 may be overlapped with the first backflow-blocking pattern P1 or the second backflow-blocking pattern P2. Therefore, the corner portion CNP of the sealing member 400 preferably has a curvature substantially equal to or larger than the first backflow-blocking pattern P1 or the second backflow-blocking pattern P2.

When a first length of each of the first and second backflow-blocking patterns P1 and P2 along the first direction D1 and a second length of each of the first and second backflow-blocking patterns P1 and P2 along the second direction D2 are less than about 1,000 micrometers (μm), a raw material forming an alignment layer and being coated in the display area DA, the peripheral area PA and a boundary of the seal line forming area SA may overflow the first and second backflow-blocking patterns P1 and P2 to flow backward to the display area DA, regardless of heights of the first and second backflow-blocking patterns P1 and P2. Thus, the first and second lengths of each of the first and second backflow-blocking patterns P1 and P2 may be preferably more than about 1,000 μm. In one exemplary embodiment, for example, each of the first and second backflow-blocking patterns P1 and P2 extends to regions corresponding to at least five pixels Px in the first direction D1.

Hereinafter, each of the first and second backflow-blocking patterns P1 and P2 will be explained with a cross-sectional structure of the display panel 501 in detail, referring to FIG. 3.

Figure 3:
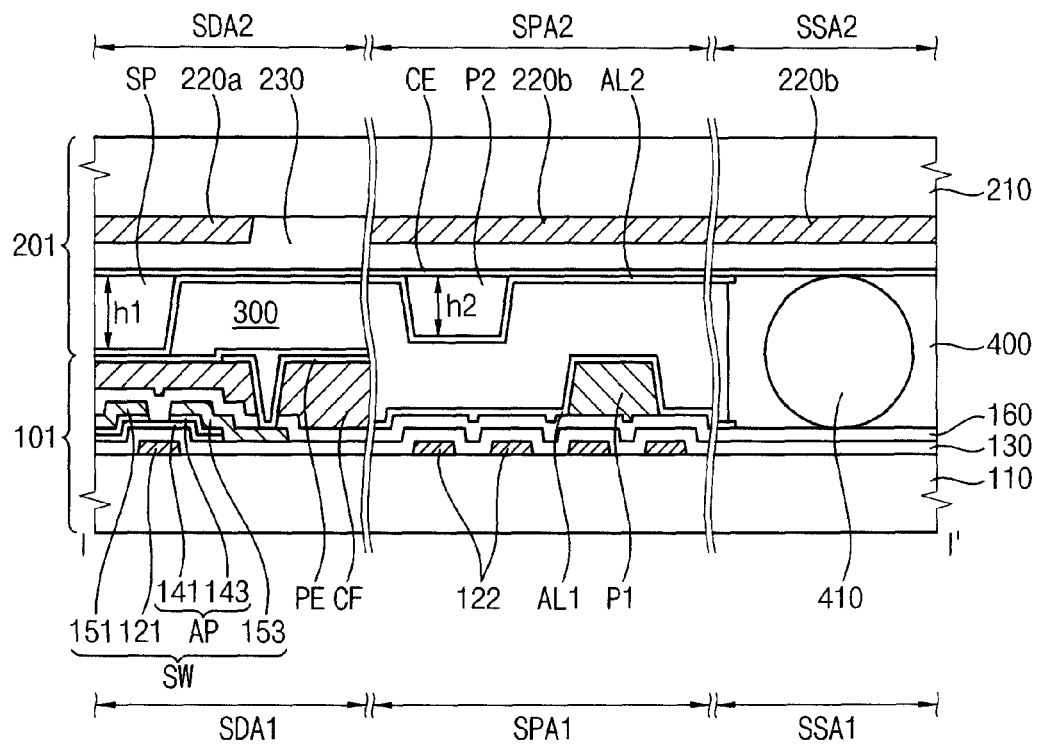
FIG. 3 is a cross-sectional view taken along line I-I' in FIG. 2.

FIG. 3 is a cross-sectional view taken along a line IT in FIG. 2.

Referring to FIG. 3, the display panel 501 illustrated referring to FIGS. 1 and 2 includes a first display substrate 101, a second display substrate 201, the liquid crystal layer 300, a pixel spacer SP and the sealing member 400. The sealing member 400 combines the first display substrate 101 with the second display substrate 201, and seals the liquid crystal layer 300 between the first and second display substrates 101 and 201.

A first base substrate 110 of the first display substrate 101 includes a first display region SDA1 corresponding to the display area DA shown FIGS. 1 and 2, a first peripheral region SPA1 corresponding to the peripheral area PA and a first seal line region SSA1 corresponding to the seal line forming area SA. A second base substrate 210 of the second display substrate 201 includes a second display region SDA2 facing the first display region SDA1, a second peripheral region SPA2 facing the first peripheral region SPA1 and a second seal line region SSA2 facing the first seal line region SSA1. In one exemplary embodiment, for example, the first and second display regions SDA1 and SDA2 overlap with each other to define the display area DA of the display panel 501, the first and second peripheral regions SPA1 and SPA2 overlap with each other to define the peripheral area PA, and the first and second seal line regions SSA1 and SSA2 overlap with each other to define the seal line forming area SA.

The first backflow-blocking pattern P1 is on the first base substrate 110 and the second backflow-blocking pattern P2 is on the second base substrate 210. In one exemplary embodiment, for example, the first display substrate 101 includes the first backflow-blocking pattern P1 in the first peripheral region SPA1 and the second display substrate 201 includes the second backflow-blocking pattern P2 in the second peripheral region SPA2. The first backflow-blocking pattern P1 is continuously disposed in the first peripheral region SPA1 and the second backflow-blocking pattern P2 is continuously disposed in the second peripheral region SPA2. Each of the first and second backflow-blocking patterns P1 and P2 is continuously formed to improve a backflow-blocking effect of the first and second backflow-blocking patterns P1 and P2, compared with a discontinuous pattern including a plurality of sub patterns having island-shape. In addition, the sealing member 400 is interposed between the first and second seal line regions SSA1 and SSA2.

The first display substrate 101 includes a first alignment layer AL1 uniformly formed in the first display region SDA1 and the first peripheral region SPA1 by using the first backflow-blocking pattern P1 during manufacturing of the display panel 501. As used herein, "uniform" may mean having a constant thickness or being in an entire of a specific area or region of the display panel 501. The first display substrate 101 further includes a switching element SW, the color filter CF and the pixel electrode PE in the first display region SDA1, and a metal pattern 122 in the first peripheral region SPA1.

The switching element SW includes a gate electrode 121, an active pattern AP, a source electrode 151 and a drain electrode 153. The gate electrode 121 is connected to a gate line (not shown) extending along the first direction D1 of the first display region SDA1. A cross-sectional structure of the gate line is substantially the same as the gate electrode 121. The active pattern AP is on a gate insulating layer 130 which is on the gate electrode 121. The active pattern AP includes a semiconductor layer 141 substantially functioned as a channel of the switching element SW, and an ohmic contact layer 143 on the semiconductor layer 141. The source electrode 151 is connected to a data line (not shown) extending along the second direction D2 and crossing the gate line. A cross-sectional structure of the data line is substantially the same as the source electrode 151. The drain electrode 153 is spaced apart from the source electrode 151.

The color filter CF is in the first display region SDA1 corresponding to the pixels Px shown in FIG. 2. The color filter CF may cover (e.g., overlap) the switching element SW. The color filter CF is on a passivation layer 160 covering the source and drain electrodes 151 and 153. In an alternative embodiment, the passivation layer 160 may be omitted, and not be on the first base substrate 110.

The pixel electrode PE is on the color filter CF and contacts the drain electrode 153 through a contact hole which extends completely through the color filter CF and the passivation layer 160. Thus, the pixel electrode PE is electrically and physically connected to the switching element SW.

The metal pattern 122 is in substantially the same metal layer as the gate electrode 121. The metal pattern 122 may be an antistatic pattern reducing or effectively preventing a static electricity from flowing into the first display region SDA1 or may be a signal line pattern applying a driving signal and/or a control signal to the first display region SDA1. The metal pattern 122 is covered by the gate insulating layer 130 and the passivation layer 160.

The first backflow-blocking pattern P1 is on the passivation layer 160 and overlapping a portion of the metal pattern 122. The first alignment layer AL1 covers the first backflow-blocking pattern P1. A height taken perpendicular to the first base substrate 101 of the first backflow-blocking pattern P1 is substantially the same as that of the color filter CF. Alternatively, the height of the first backflow-blocking pattern P1 may be larger than that of the color filter CF. The first backflow-blocking pattern P1 is in substantially the same layer as the color filter CF. When a red color filter, a green color filter and a blue color filter are on the first display substrate 101, the first backflow-blocking pattern P1 may be in substantially the same layer as the blue color filter.

Although not shown in figures, the first backflow-blocking pattern P1 may have a multilayered structure including at least two color layers of substantially the same material as the red, green and blue color filters. In one exemplary embodiment, for example, the first backflow-blocking pattern P1 may include the multilayered structure such as a double layered structure or a triple layered structure, different from a single layered structure shown in FIG. 3.

The first alignment layer AL1 is on the pixel electrode PE. The first alignment layer AL1 is in the first display region SDA1 and the first peripheral region SPA1. The first alignment layer AL1 may include a polyimide based compound, a polyamic acid based compound, or in mixture thereof. The first alignment layer AL1 may be uniformly formed in the first display region SDA1 and the first peripheral region SPA1 by using the first backflow-blocking pattern P1 during manufacturing of the display panel 501. The first alignment layer AL1 may extend into the first seal line region SSA1. However, an adhesive strength between the first alignment layer AL1 and the sealing member 400 is weak so that, preferably, an area in the first seal line region SSA1 covered by the first alignment layer AL1 is much narrower than an area absent the first alignment layer AL1. In one exemplary embodiment, for example, a lower surface of the sealing member 400 directly contacts the passivation layer 160 on the first display substrate 101.

The second display substrate 201 include a second alignment layer AL2 uniformly formed in the second display region SDA2 and the second peripheral region SPA2 by using the second backflow-blocking pattern P2 during manufacturing of the display panel 501. The second display substrate 201 further includes a light-blocking pattern 220a and 220b, an overcoating layer 230 and the common electrode CE.

The light-blocking pattern 220a and 220b is in the second display region SDA2 and the second peripheral region SPA2. In one exemplary embodiment, for example, the light-blocking pattern 220a and 220b may include a matrix portion 220a in the second display region SDA2, and an outer portion 220b connected to the matrix portion 220a and in the second peripheral region SPA2. The matrix portion 220a is in a boundary between adjacent pixels Px shown in FIG. 2 to divide the pixels Px in a matrix arrangement. The outer portion 220b extends into the second seal line region SSA2 from the second peripheral region SPA2.

The overcoating layer 230 is on the second base substrate 210 including the light-blocking pattern 220a and 220b. The overcoating layer 230 may minimize a stepped portion between a surface of a region of the light-blocking pattern 220a and 220b and a surface of the second base substrate 210. In addition, the overcoating layer 230 may reduce or effectively prevent impurities generated from the light-blocking pattern 220a and 220b from flowing into the liquid crystal layer 300. In an alternative embodiment, the overcoating layer 230 may not be on the second base substrate 210 and may be omitted in the second base substrate 210.

The common electrode CE is on the overcoating layer 230. The common electrode CE is on an entire of the second base substrate 210. A vertical electric field is formed between the common electrode CE and the pixel electrode PE.

The second backflow-blocking pattern P2 is on the common electrode CE. The second backflow-blocking pattern P2 is in the second peripheral region SPA2. The second backflow-blocking pattern P2 is spaced apart from the first backflow-blocking pattern P1 in the first and second directions D1 and D2 by a predetermined distance. The second backflow-blocking pattern P2 is in substantially the same layer as the pixel spacer SP in the second display region SDA2.

The second alignment layer AL2 is on the second backflow-blocking pattern P2 and directly contacts the second backflow-blocking pattern P2 and the common electrode CE. The second alignment layer AL2 may include a polyimide based compound, a polyamic acid based compound, or a mixture thereof. The second alignment layer AL2 may be uniformly formed in the second display region SDA2 and the second peripheral region SPA2 by using the second backflow-blocking pattern P2 during manufacturing of the display panel 501. The second alignment layer AL2 may be partially in or extended into the second seal line region SSA2. However, preferably, an area in the second seal line region SSA2 covered by the second alignment layer AL2 is much narrower than an area absent the second alignment layer AL2. An upper surface of the sealing member 400 directly contacts the common electrode CE on the second display substrate 201.

The pixel spacer SP is in the display area DA of the display panel 501 to maintain a constant gap between the first and second display substrates 101 and 201. In one exemplary embodiment, for example, the pixel space SP is between the first display region SDA1 and the second display region SDA2. In one exemplary embodiment, for example, the pixel spacer SP is on the common electrode CE of the second display region SDA2 an covered by the second alignment layer AL2. A first height $h_1$ of the pixel spacer SP is substantially the same as a second height $h_2$ of the second backflow-blocking pattern P2. Alternatively, the second height $h_2$ may be smaller than the first height $h_1$.

The second backflow-blocking pattern P2 is preferably thicker than the second alignment layer AL2 in a direction perpendicular to the second base substrate 210. In order to reduce or effectively prevent a raw material of the second alignment layer AL2 which is coated on the second base substrate 210 from flowing over the second backflow-blocking pattern P2 during manufacturing of the display panel 501, the second height $h_2$ is substantially equal to or larger than the height of the second alignment layer AL2.

The sealing member 400 is between the first and second seal line regions SSA1 and SSA2. The sealing member 400 partially overlaps with the first and second alignment layers AL1 and AL2 in a region adjacent to the first and second peripheral regions SPA1 and SPA2. The first and second backflow-blocking patterns P1 and P2 shown in FIGS. 1 and 2 have substantially the same curvature as the corner portion CNP of the sealing member 400 so that a region in which the sealing member 400 overlaps with the first or second alignment layers AL1 or AL2 may be minimized, during forming of the sealing member 400 on the first or second display substrates 101 or 201.

The display panel 501 further includes a seal spacer 410 in the sealing member 400. The seal spacer 410 is in the sealing member 400 to maintain a constant gap of a boundary between the first and second display substrates 101 and 201. The seal spacer 410 directly contacts with each of the first and second alignment layers AL1 and AL2.

Hereinafter, an exemplary embodiment of a method of manufacturing the display panel 501 shown in FIG. 5 will be illustrated referring to FIGS. 4A, 4B, 5A, 5B and 6.

Figure 4A:
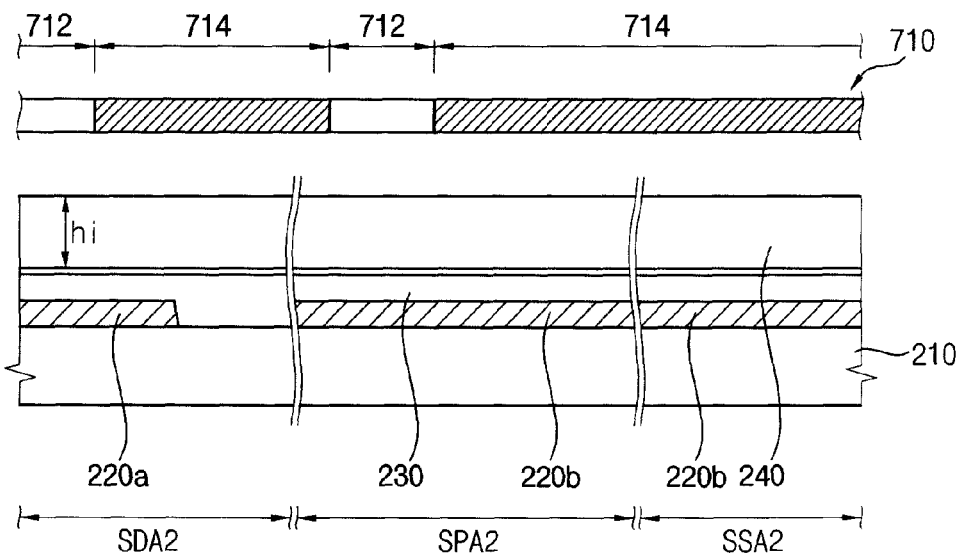
FIGS. 4A and 4B are cross-sectional views illustrating an exemplary embodiment of a method of manufacturing a second display substrate shown in FIG. 3.
Figure 4B:
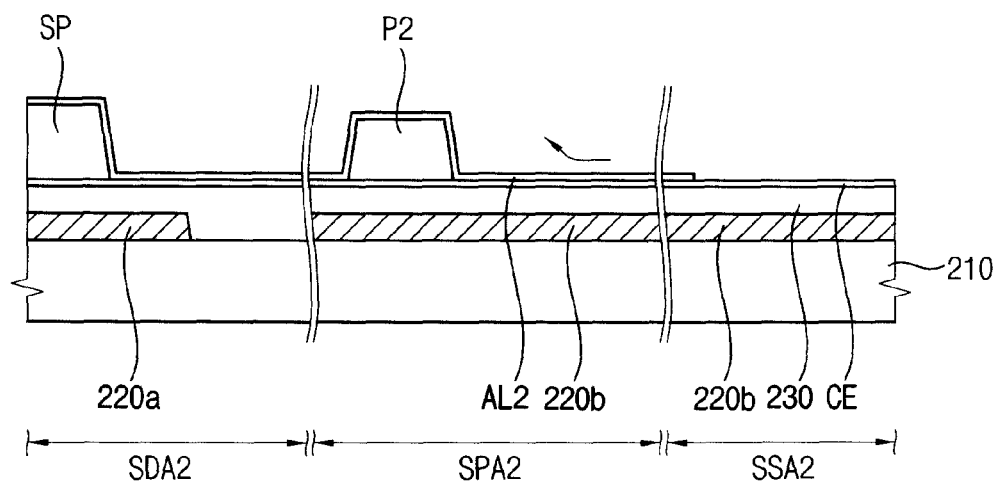

FIGS. 4A and 4B are cross-sectional views illustrating an exemplary embodiment a method of manufacturing the second display substrate shown in FIG. 3.

Referring to FIG. 4A, after the light-blocking pattern 220a and 220b is formed on the second base substrate 210, the overcoating layer 230 and the common electrode CE are sequentially formed on the second base substrate 210 on which the light-blocking pattern 220a and 220b is formed.

A light-blocking layer is formed on the second base substrate 210 and is patterned to form the light-blocking pattern 220a and 220b. The matrix portion 220a of the light-blocking pattern 220a and 220b is formed in the second display region SDA2, and the outer portion 220b is formed in the second peripheral region SPA2 and the second seal line region SSA2. Each of the overcoating layer 230 and the common electrode CE is formed on an entire of the second base substrate 210 on which the light-blocking pattern 220a and 220b is formed.

A photo layer 240 is formed on the second base substrate 210 on which the common electrode CE is formed, and a mask 710 is disposed over the photo layer 240.

The photo layer 240 includes an organic material having photosensitivity. The photo layer 240 may include a negative-type photoresist layer which is hardened by light. A thickness $h_t$ of the photo layer 240 is larger than each of the final first and second heights $h_1$ and $h_2$ described in FIG. 3. The thickness $h_t$ of the photo layer 240 may be at least equal to the first height $h_1$.

The mask 710 includes a light-transmissive portion 712 and a light-blocking portion 714. The light-transmissive portion 712 may correspond to a first forming region of the pixel spacer SP in the second display region SDA2 and a second forming region of the second backflow-blocking pattern P2 in the second peripheral region SPA1. The light-blocking portion 714 may correspond to a remaining region except for the first and second forming regions. When the light is provided to the mask 710, the light passes through the light-transmissive portion 712 to be provided to the photo layer 240, and the light is blocked by the light-blocking portion 714 not to be provided to the photo layer 240.

Referring to FIG. 4B, the photo layer 240 receiving the light is developed to form the pixel spacer SP and the second backflow-blocking pattern P2. The second backflow-blocking pattern P2 is continuously formed in the second peripheral region SPA2. The second alignment layer AL2 is formed on the second base substrate 210 on which the pixel spacer SP and the second backflow-blocking pattern P2 are formed.

The second alignment layer AL2 is formed via jetting an ink including the raw material of the second alignment layer AL2 on the second base substrate 210. The second alignment layer AL2 may be formed via additionally rubbing a coating layer coated by the raw material of the second alignment layer AL2 according to a liquid crystal mode of the liquid crystal layer 300. The raw material of the second alignment layer AL2 may include a polyimide based compound and/or a polyamic acid based compound. Alternatively, the second alignment layer AL2 may be formed via rolling the raw material using a roller.

The second alignment layer AL2 is formed in the second display region SDA2 and the second peripheral region SPA2. When the raw material of the second alignment layer AL2 is uniformly coated in the display area DA and the peripheral area PA of the display panel 501, the raw material does not overflow the second backflow-blocking pattern P2 and thus does not flow back into the second display region SDA2 even though the repulsive force between the common electrode CE and the raw material in the vertex portion EGP is generated by the chemical characteristic of the raw material. In an exemplary embodiment, for example, the second backflow-blocking pattern P2 may reduce or effectively prevent the second alignment layer AL2 from being rolled toward the second display region SDA2 from the second peripheral region SPA2, as indicated by the arrow in FIG. 4B.

Therefore, the second display substrate 201 shown in FIG. 3, on which the second alignment layer AL2 is uniformly formed in the second display region SDA2, is manufactured. The uniform second alignment layer AL2 has a substantially constant thickness.

Figure 5A:
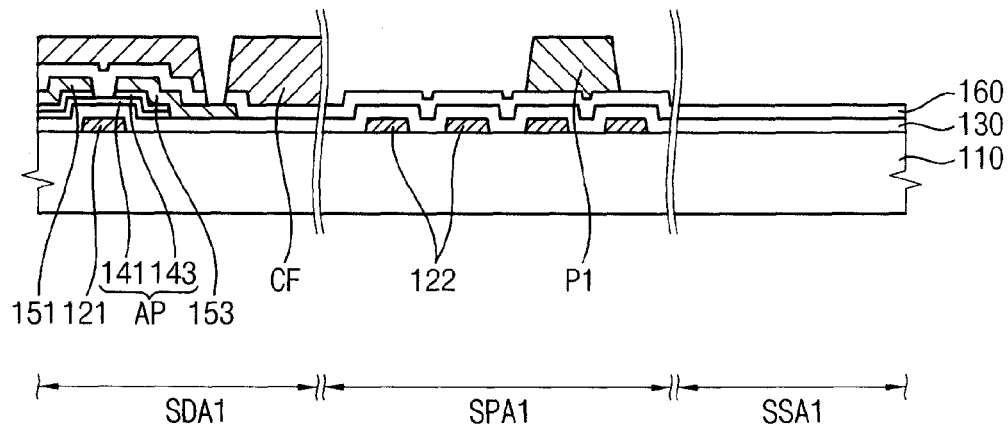
FIGS. 5A and 5B are cross-sectional views illustrating an exemplary embodiment of a method of manufacturing a first display substrate shown in FIG. 3.
Figure 5B:
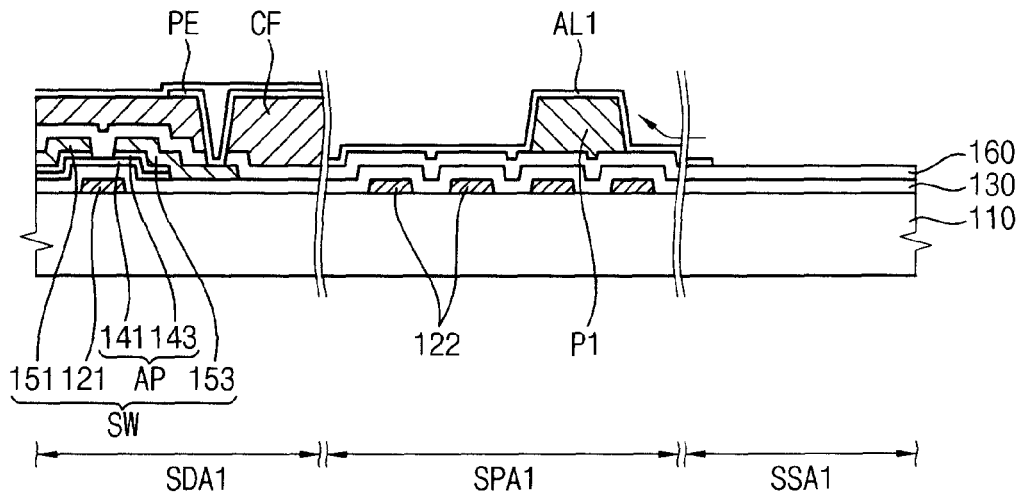

FIGS. 5A and 5B are cross-sectional views illustrating an exemplary embodiment of a method of manufacturing the first display substrate shown in FIG. 3.

Referring to FIG. 5A, a gate pattern, the gate insulating layer 130 and the active pattern AP are sequentially formed on the first base substrate 110. The gate pattern includes the gate electrode 121, the gate line connected to the gate electrode 121, and the metal pattern 122. A source pattern is formed on the first base substrate 110 on which the active pattern AP is formed. The source pattern includes the source electrode 151, the data line connected to the source electrode 151, and the drain electrode 153. The passivation layer 160 is formed on the first base substrate 110 on which the source pattern is formed.

A color filter layer is formed on the first base substrate 110 on which the passivation layer 160 is formed, and the color filter layer is patterned to form the color filter CF and the first backflow-blocking pattern P1. In forming the color filter CF, portions of the color filter CF and the passivation layer 160 on the drain electrode 153 are partially removed to form a contact hole partially exposing the drain electrode 153. A height of the color filter CF is substantially the same as that of the first backflow-blocking pattern P1. Alternatively, the height of the color filter CF may be different from that of the first backflow-blocking pattern P1. The first backflow-blocking pattern P1 is continuously formed in the first peripheral region SPA1.

Although not shown in figures, after forming the color filter CF, additional color filters having different color from the color filter CF may be further formed. In one exemplary embodiment, for example, when the color filter CF is the blue color filter, the green and red color filters are formed after forming the blue color filter CF. A first color layer is formed in a region corresponding to the first backflow-blocking pattern P1 in forming the blue color filter, and a second color layer in substantially the same layer as the green color filter is formed on the first color layer in forming the green color layer. Thus, the first backflow-blocking pattern P1 has a double layered structure including the first and second color layers. Alternatively, a third color layer in substantially the same layer as the red color filter is further formed on the second color layer in forming the red color filter. Then, the first backflow-blocking pattern P1 may have a triple layered structure including the first, second and third color layers. A thickness of the first backflow-blocking pattern P1 may be changed by adjusting an intensity of the light in forming the first, second and third color layers, even though the first backflow-blocking pattern P1 has a single structure or a multilayered structure.

Referring to FIG. 5B, the pixel electrode PE is formed on the first base substrate 110 on which the color filter CF and the first backflow-blocking pattern P1 are formed. The pixel electrode PE is formed in the first display region SDA1. In forming the pixel electrode PE, a further electrode pattern (not shown) may be formed from substantially the same layer as the pixel electrode PE in the first peripheral region SPA1. The electrode pattern may not be formed on the first backflow-blocking pattern P1. When the electrode pattern is formed on the first backflow-blocking pattern P1, an electric short circuit is generated between the electrode pattern and the common electrode CE to generate a wrong signal.

The first alignment layer AL1 is formed on the first base substrate 110 on which the pixel electrode PE is formed. The first alignment layer AL1 is formed in the first peripheral region SPA1 and the first display region SDA1. The first alignment layer AL1 is formed via substantially the same process as the second alignment layer AL2 except for being formed on the first base substrate 110. Thus, any repetitive descriptions will be omitted. The first backflow-blocking pattern P1 minimizes a rolling of the first alignment layer AL1 back toward the first display region SDA1 from the first peripheral region SPA1 as similarly described above, so that the first alignment layer AL1 may be uniformly formed in the first display region SDA1. The uniform first alignment layer AL1 has a substantially constant thickness. Therefore, the first display substrate 101 shown in FIG. 3, on which the first alignment layer AL1 is uniformly formed in the first display region SDA1, is manufactured.

Figure 6:
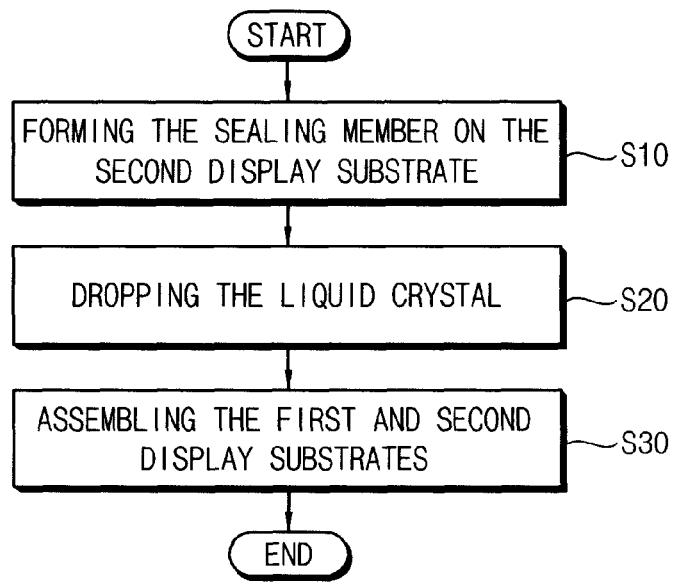
FIG. 6 is a flow chart illustrating an exemplary embodiment of an assembly process of the first and second display substrates shown in FIG. 3.

FIG. 6 is a flow chart illustrating an exemplary embodiment of an assembly process of the first and second display substrates shown in FIG. 3.

Referring to FIG. 6, the sealing member 400 is formed on the second display substrate 201 manufactured via the above-mentioned processes referring to FIGS. 4A and 4B (step S10). The sealing member 400 is formed in the second seal line region SSA2.

The sealing member 400 may be formed using a seal line forming device (not shown). A sealing material of the sealing member 400 may be injected onto the second display substrate 201 through a nozzle of the seal line forming device.

The nozzle is moved along the first direction D1 from a point of the second seal line region SSA2, and a moving direction of the nozzle is changed to the second direction D2. After changing the first direction D1 into the second direction D2, the nozzle is moved along the second direction D2 and the moving direction is changed again to the first direction D1. After changing the second direction D2 into the first direction D1, the nozzle is moved along the first direction D1 and the moving direction is changed again to the second direction D2 to be returned to the point, and thus the sealing member 400 having a looped curve shown in FIGS. 1 and 2 is formed.

When the moving direction of the nozzle is changed from the first direction D1 to the second direction D2 or from the second direction D2 to the first direction D1, the nozzle is moved along a curved path having a curvature in order to improve a consistence of the sealing member 400. Thus, the corner portion CNP of the sealing member 400 has a curvature defined by the curved path of the nozzle.

A portion of the second backflow-blocking pattern P2 corresponding to the vertex portion EGP also has a curvature to minimize an area in which the sealing member 400 overlaps with the second backflow-blocking pattern P2.

A liquid crystal composition is dropped onto the second display region SDA2 of the second base substrate 210 on which the sealing member 400 is formed (step S20). The second display substrate 201 on which the liquid crystal composition is dropped is combined with the first display substrate 101 which is manufactured via the above-mentioned processes in FIGS. 5A and 5B (step S30). Therefore, the first and second display substrates 101 and 201 are combined by the sealing member 400, and the liquid crystal composition is between the first and second display substrates 101 and 201, to form the liquid crystal layer 300. Thus, the display panel 501 shown in FIG. 3 is manufactured.

Alternatively, the sealing member 400 may have a substantially looped shape including an opening portion. After the first and second display substrates 101 and 201 are combined by the sealing member 400, the liquid crystal composition is injected through the opening portion to form the liquid crystal layer 300.

According to the illustrated exemplary embodiment, the first backflow-blocking pattern P1 may reduce or effectively prevent the first alignment layer AL1 from flowing backward into the first display region SDA1 from the first peripheral region SPA1, so that the first alignment layer AL1 may be uniformly formed in the first display region SDA1. In addition, the second alignment layer AL2 may be uniformly formed in the second display region SDA2 by the second backflow-blocking pattern P2 in a similar manner.

The first and second backflow-blocking patterns P1 and P2 are formed in processes of forming other components of the first and second display substrates 101 and 201 so that the first and second backflow-blocking patterns P1 and P2 may be easily and simply formed without additional processes.

In addition, the first and second backflow-blocking patterns P1 and P2 have substantially the same curvature as the corner portion CNP of the sealing member 400 to minimize the area in which the sealing member 400 overlaps with the second backflow-blocking pattern P2 when the sealing member 400 is formed on the second display substrate 201 on which the second backflow-blocking pattern P2 is formed. Furthermore, when the second display substrate 201 on which the sealing member 400 is formed is combined with the first display substrate 101, an area in which the first backflow-blocking pattern P1 overlaps with the sealing member 400 may be minimized. Thus, the first and second backflow-blocking patterns P1 and P2 may reduce or effectively prevent decrease of the forming reliability of the sealing member 400.

In addition, although an electrode pattern (not shown) in substantially the same layer as the pixel electrode PE is formed in the first peripheral region SPA1, the second backflow-blocking pattern P2 is disposed on the common electrode CE so that the electric short circuit between the common electrode CE and the electrode pattern is fundamentally reduced or effectively prevented.

Figure 7:
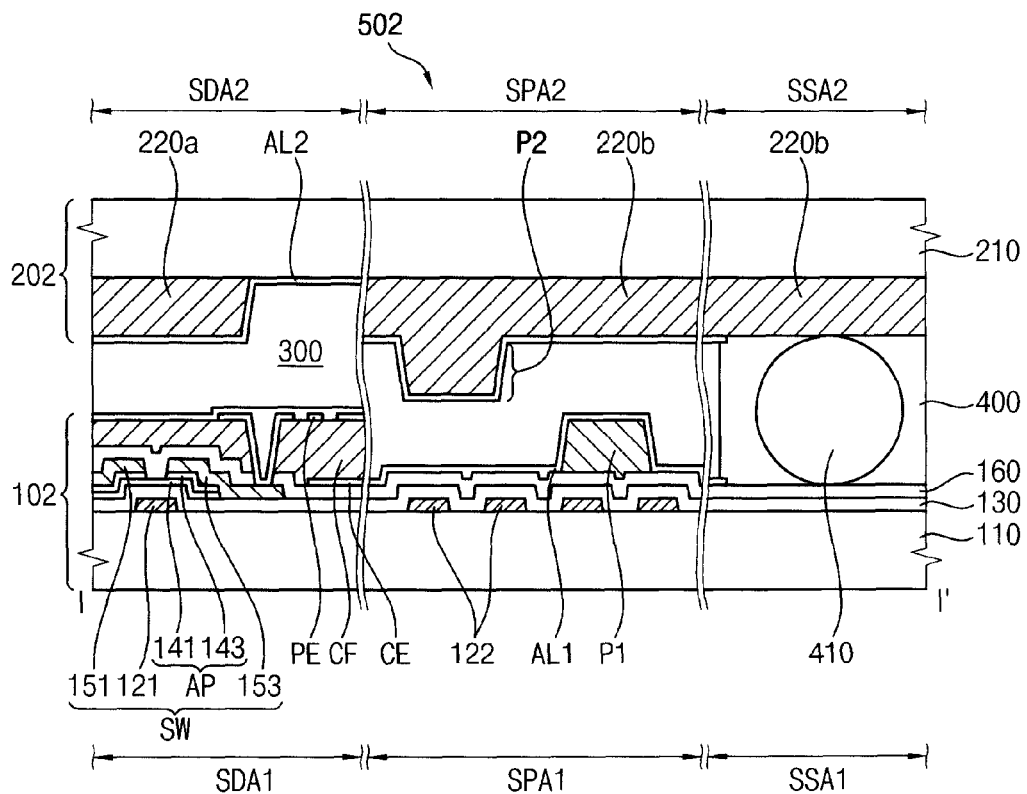
FIG. 7 is a cross-sectional view illustrating another exemplary embodiment of a display panel according to the invention.

FIG. 7 is a cross-sectional view illustrating another exemplary embodiment of a display panel according to the invention.

A plane structure of a display panel 502 shown in FIG. 7 is substantially the same as the display panel 501 shown in FIGS. 1 and 2. Thus, the plane structure of the display panel 502 shown in FIG. 7 refers to FIGS. 1 and 2, and a cross-sectional structure of the display panel 502 refers to FIG. 7. Descriptions for the plane structure of the display panel 502 shown in FIG. 7 are substantially the same as those in FIGS. 1 and 2, so that any repetitive descriptions will be omitted.

Referring to FIGS. 1, 2 and 7, the display panel 502 includes a first display substrate 102 including the first backflow-blocking pattern P1, a second display substrate 202 including the second backflow-blocking pattern P2, the liquid crystal layer 300 and the sealing member 400.

The first display substrate 102 is substantially the same as the first display substrate 101 shown in FIG. 3 except for further including the common electrode CE and a shape of the pixel electrode PE. Thus, any repetitive descriptions will be omitted.

The common electrode CE is on a passivation layer 160 covering a source electrode 151 and a drain electrode 153 on the first display substrate 102. The common electrode CE is insulated from a data line connected to the source electrode 151, and a gate line connected to a gate electrode 121 and crossing the data line in a first display region SDA1 of the first base substrate 110 by an area in which the gate line and the data line do not overlap with the common electrode CE. The color filter CF is on the common electrode CE. The first backflow-blocking pattern P1 is in substantially the same layer as the color filter CF.

The pixel electrode PE is on the color filter CF. The pixel electrode PE includes a plurality of slit electrodes. The pixel electrode PE is insulated from the common electrode CE by the color filter CF. The silt electrodes and the common electrode CE generate a horizontal electric field in the liquid crystal layer 300.

A first alignment layer AL1 of the first display substrate 102 is formed in a first display region SDA1 and a first peripheral region SPA1. The first alignment layer AL1 is disposed on the pixel electrode PE and the first backflow-blocking pattern P1.

Referring to FIG. 7, the first display substrate 102 includes a structure having the common electrode CE, the color filter CF and the pixel electrode PE sequentially stacked. Alternatively, the pixel electrode PE connected to the switching element SW may be on the passivation layer 160 and contacting the drain electrode 153 through a hole of the passivation layer 160. Then, the color filter CF may be on the pixel electrode PE, and the common electrode CE may be on the color filter CF with being insulated from the pixel electrode PE. When the common electrode CE is on the color filter CF, the color filter CF may not include a hole.

The second display substrate 202 includes the light-blocking pattern 220a and 220b, the second alignment layer AL2 and the second backflow-blocking pattern P2 which are on a second base substrate 210.

The light-blocking pattern 220a and 220b may include a matrix portion 220a in a second display region SDA2, and an outer portion 220b in a second peripheral region SPA2 and a second seal line region SSA2. The light-blocking pattern 220a and 220b may include a photosensitive composition including a pigment or a dye.

The second backflow-blocking pattern P2 is on the outer portion 220b of the light-blocking pattern 220a and 220b. The second backflow-blocking pattern P2 is integrally formed with the outer portion 220b on the outer portion 220b, such that the second backflow-blocking pattern P2 and the outer portion 220b are a single unitary indivisible member. Thus, a region of the outer portion 220b including the second backflow-blocking pattern P2 is protruded, compared to a remaining region of the outer portion 220b. Although the second backflow-blocking pattern P2 is in substantially the same layer as the light-blocking pattern 220a and 220b, the first display substrate 102 includes the common electrode CE so that an electric short circuit between the first and second display substrates 102 and 202 may be fundamentally reduced or effectively prevented.

The second alignment layer AL2 is on the second base substrate 210 including the light-blocking pattern 220a and 220b and the second backflow-blocking pattern P2. In one exemplary embodiment, for example, the second alignment layer AL2 directly contacts the light-blocking pattern 220a and 220b, the second backflow-blocking pattern P2 and a surface of the second base substrate 210 in a region overlapping the pixel electrode PE.

Figure 8:
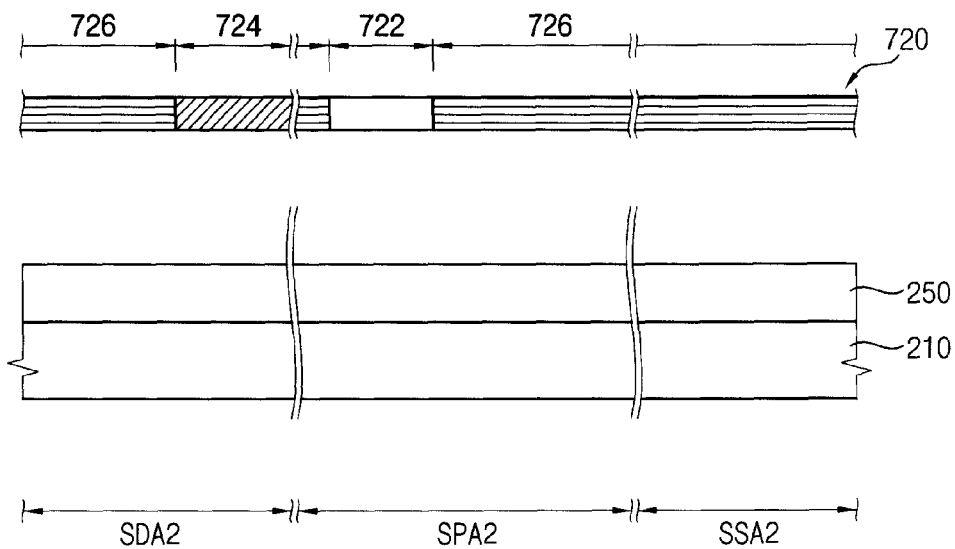
FIGS. 8 and 9 are cross-sectional views illustrating an exemplary embodiment of a method of manufacturing a first display substrate and a second display substrate shown in FIG. 7.
Figure 9:
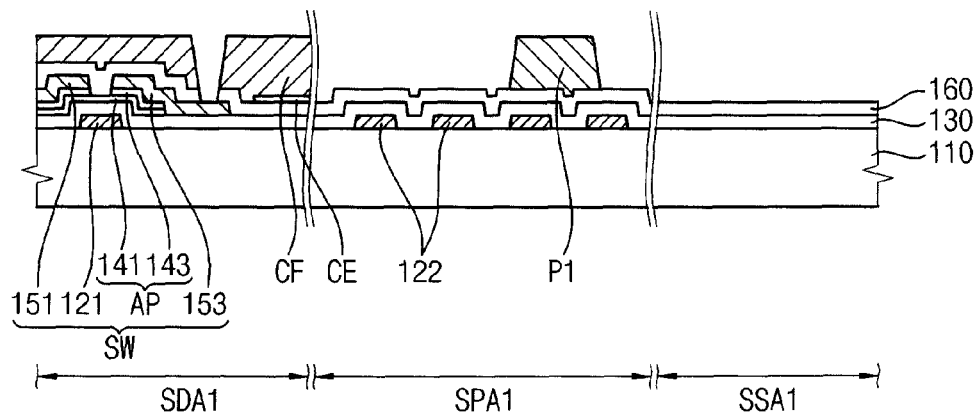

FIGS. 8 and 9 are cross-sectional views illustrating an exemplary embodiment of a method of manufacturing the first display substrate and the second display substrate shown in FIG. 7.

FIG. 8 is a cross-sectional view illustrating an exemplary embodiment of a method of manufacturing the second display substrate 202 shown in FIG. 7, and FIG. 9 is a cross-sectional view illustrating an exemplary embodiment of a method of manufacturing the first display substrate 102 shown in FIG. 7.

Referring to FIG. 8, a light-blocking layer 250 is formed on the second base substrate 210 and a mask 720 is disposed over the light-blocking layer 250. A light is provided to the mask 720 which is over the light-blocking layer 250.

In one exemplary embodiment, for example, the light-blocking layer 250 includes a negative-type photoresist layer hardened in a light exposure region and removed in a light-blocking region after being developed. The negative-type photoresist layer may include a photosensitive composition including a pigment or a dye. The light-blocking layer 250 includes the negative-type photoresist layer so that a thickness of the light-blocking layer 250 may be larger than that of a chrome thin film formed via a sputtering process.

The mask 720 includes a light-transmissive portion 722, a light-blocking portion 724 and a light-transflective portion 726. The light-transmissive portion 722 corresponds to a forming region of the second backflow-blocking pattern P2. The light-transflective portion 726 corresponds to forming regions of the light-blocking pattern 220a and 220b. A light intensity passing through the light-transflective portion 726 is less than a light intensity passing through the light-transmissive portion 722.

Since the light-blocking layer 250 facing the light-transmissive portion 722 receives the light more than the light-blocking layer 250 facing the light-transflective portion 726, a resulting height of the light-blocking layer 250 facing the light-transmissive portion 722 is larger than that of the light-blocking layer 250 facing the light-transflective portion 726 after developing the light-blocking layer 250. The remaining region except for the light-transmissive portion 722 and the light-transflective portion 726 corresponds to the light-blocking portion 724, and the light-blocking layer 250 facing the light blocking part 724 is completely removed in developing the light-blocking layer 250. Thus, the second backflow-blocking pattern P2 is formed in the region corresponding to the light-transmissive portion 722, and the light-blocking pattern 220a and 220b is formed in the region corresponding to the light-transflective portion 726. The light blocking pattern 220a and 220b is thinner than the second backflow-blocking pattern P2.

The second alignment layer AL2 is formed on the second base substrate 210 on which the light-blocking pattern 220a and 220b is formed. The second alignment layer AL2 may be uniformly formed in the second display region SDA2 by the second backflow-blocking pattern P2 in a similar manner described above with respect to FIGS. 4A and 4B.

Therefore, the second display substrate 202 shown in FIG. 7 is manufactured.

Referring to FIG. 9, the switching element SW is formed in the first display region SDA1 of the first base substrate 110, and the metal pattern 122 is formed in the first peripheral region SPA1. Forming the switching element SW and the metal pattern 122 is substantially the same process as explained above referring to FIG. 5A, and thus any repetitive descriptions will be omitted.

The passivation layer 160 and the common electrode CE are sequentially formed on the first base substrate 110 on which the switching element SW and the metal pattern 122 are formed. The passivation layer 160 is formed on the gate insulating layer 130 covering the switching element SW and the metal pattern 122. The common electrode CE is formed on the passivation layer 160.

The color filter CF and the first backflow-blocking pattern P1 are formed on the first base substrate 110 on which the common electrode CE is formed. The color filter CF and the first backflow-blocking pattern P1 are formed via patterning one color filter layer.

Referring to FIG. 9 with FIG. 7, the pixel electrode PE and the first alignment layer AL1 are sequentially formed on the first base substrate 110 on which the color filter CF and the first backflow-blocking pattern P1 are formed.

The pixel electrode PE is formed in the first display region SDA1. The metal pattern 122 is formed in the first peripheral region SPA1 in forming the pixel electrode PE. Although the metal pattern 122 is formed in the first peripheral region SPA1, the common electrode CE is already formed in the first display region SDA1 so that an electric short circuit between the first and second display substrates 102 and 202 when the first and second display substrates 102 and 202 are combined with each other may be reduced or effectively prevented. In one exemplary embodiment, for example, although the metal pattern 122 is formed overlapping the first backflow-blocking pattern P1, the electric short circuit may not be generated.

The first alignment layer AL1 is formed on the first base substrate 110 on which the pixel electrode PE is formed. The first alignment layer AL1 may be uniformly formed in the first display region SDA1 by the first backflow-blocking pattern P1 in a similar manner described above with respect to FIGS. 5A and 5B.

Therefore, the first display substrate 102 shown in FIG. 7 is manufactured.

The sealing member 400 is disposed at the second display substrate 202 which is manufactured via the above-mentioned method referring to FIG. 8, and a liquid crystal composition is dropped on the second display substrate 202. After dropping the liquid crystal composition, the second display substrate 202 is combined with the first display substrate 102. Assembling the first and second display substrates 102 and 202 is substantially the same as explained above referring to FIG. 6 and thus any repetitive descriptions will be omitted.

In an alternative embodiment, when the first display substrate 102 includes a structure having the pixel electrode PE, the color filter CF and the common electrode CE sequentially stacked on the first base substrate 110, the passivation layer 160 including a hole partially exposing the drain electrode 153 is formed on the first base substrate 110 on which the switching element SW is formed, and the pixel electrode PE is formed directly on the passivation layer 160. After the color filter CF and the first backflow-blocking pattern P1 are formed on the first base substrate 110 on which the pixel electrode PE is formed, the common electrode CE is formed directly on the color filter CE to manufacture the first display substrate 102.

According to the illustrated exemplary embodiment, the first alignment layer AL1 may be uniformly formed on the first base substrate 110 by using the first backflow-blocking pattern P1. In addition, the second alignment layer AL2 may be uniformly formed on the second base substrate 210 by using the second backflow-blocking pattern P2. Each of the first and second backflow-blocking patterns P1 and P2 is formed in processes of forming other components of the first or second display substrates 102 or 202 so that the first and second backflow-blocking patterns P1 and P2 may be easily and simply formed without additional processes. In addition, the first and second backflow-blocking patterns P1 and P2 may reduce or effectively prevent decrease of reliability in forming the sealing member 400.

Figure 10:
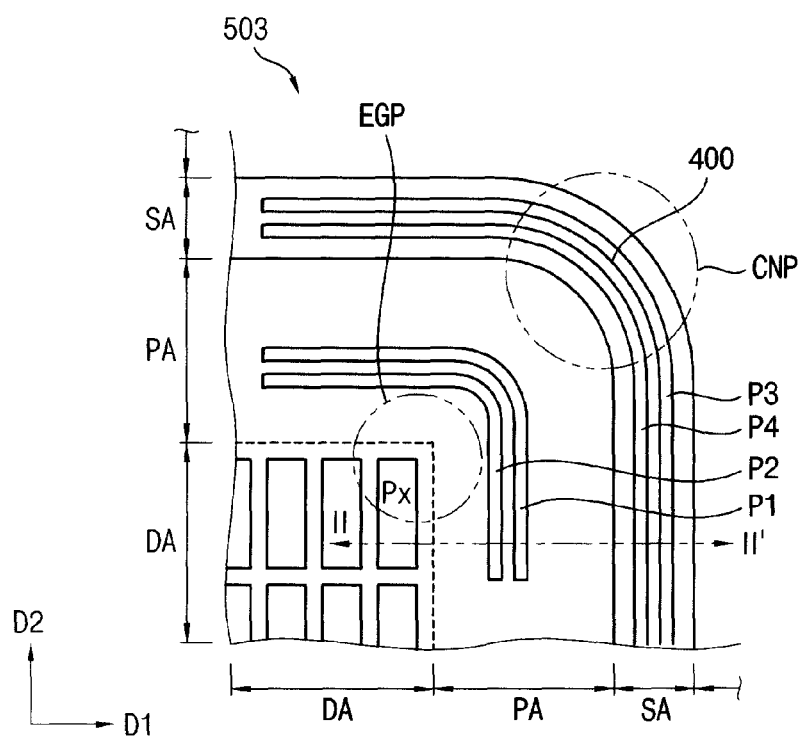
FIG. 10 is a plan view illustrating still another exemplary embodiment of a display panel according to the invention.

FIG. 10 is a plan view illustrating still another exemplary embodiment of a display panel according to still the invention, and FIG. 11 is a cross-sectional view taken along line II-II' in FIG. 10.

Referring to FIGS. 10 and 11, a display panel 503 includes a first display substrate 103 including the first backflow-blocking pattern P1 and a first spread-blocking pattern P3, a second display substrate 203 including the second backflow-blocking pattern P2 and a second spread-blocking pattern P4, the liquid crystal layer 300 and the sealing member 400. The display panel 503 further includes a seal spacer 420 in the sealing member 400. The first and second spread-blocking patterns P3 and P4 are in the seal line forming area SA of the display panel 503.

The display panel 503 is substantially the same as the display panel 501 shown in FIGS. 1 to 3 except that the first display substrate 103 further includes the first spread-blocking pattern P3 and the second display substrate 203 further includes the second spread-blocking pattern P4. Thus, any repetitive descriptions will be omitted.

The first spread-blocking pattern P3 is in a first seal line region SSA1 of the first base substrate 110 corresponding to the seal line forming area SA. The first spread-blocking pattern P3 is continuously disposed in a predetermined region of the first seal line region SSA1 and has a shape of a continuous line when viewed in a plan. Alternatively, the first spread-blocking pattern P3 may include a plurality of sub patterns having island shape. Then, the first spread-blocking pattern P3 may have a dotted line when viewed in a plan. The first spread-blocking pattern P3 is in substantially the same layer as the first backflow-blocking pattern P1 and the color filter CF. A raw material of a first alignment layer AL1 overflowing the first backflow-blocking pattern P1 and spreading to the first seal line region SSA1 may be reduced or effectively prevented by the first spread-blocking pattern P3 in forming the first alignment layer AL1. In order to uniformly form the first alignment layer AL1 in the first display region SDA1, the first backflow-blocking pattern P1 is used during the coating of the raw material of the first alignment layer AL1 from the first display region SDA1 to a first peripheral region SPA1. When the raw material is spread to the first seal line region SSA1, an adhesive strength between the sealing member 400 and the first display substrate 103 may be weak. Thus, the first spread-blocking pattern P3 is in the first seal line region SSA1 to reduce or effectively prevent the raw material of the first alignment layer AL1 from further spreading in the first seal line SSA1.

The second spread-blocking pattern P4 is in a second seal line region SSA2 of the second base substrate 210 corresponding to the seal line forming area SA. The second spread-blocking pattern P4 is continuously disposed in a predetermined region of the second seal line region SSA2 and has a shape of a continuous line when viewed in a plan. Alternatively, the second spread-blocking pattern P4 may include a plurality of sub patterns having island shape. Then, the second spread-blocking pattern P4 may have a dotted line when viewed in a plan. The second spread-blocking pattern P4 is in substantially the same layer as the second backflow-blocking pattern P2 and the pixel spacer SP. The second spread-blocking pattern P4 may reduce or effectively prevent a raw material of a second alignment layer AL2 from further spreading to the second seal line region SSA2.

Each of the first and second spread-blocking patterns P3 and P4 corresponding to a vertex portion EGP of the display area DA has substantially the same curvature as a corner portion CNP of the sealing member 400. The first and second spread-blocking patterns P3 and P4 have substantially the same curvature as the first and second backflow-blocking patterns P1 and P2 corresponding to the vertex portion EGP of the display area DA. Alternatively, each of the first and second spread-blocking patterns P3 and P4 may have a curvature different from the first and second backflow-blocking patterns P1 and P2. For example, each of the first and second spread-blocking patterns P3 and P4 has a curvature equal to or larger than the first and second backflow-blocking patterns P1 and P2. A direction turning point of each of the first and second spread-blocking patterns P3 and P4 has a curved shape to easily reduce or effectively prevent each of the first and second alignment layers AL1 and AL2 from spreading to the seal line forming area SA during manufacturing of the display panel 503. In addition, a direction turning point of each of the first and second spread-blocking patterns P3 and P4 has a curved shape to reduce or effectively prevent the sealing member 400 from being collapsed by a repulsive force between the sealing member 400 and the first and second spread-blocking patterns P3 and P4 in forming the sealing member 400, and thus the sealing member 400 is successively formed in the seal line forming area SA.

The second spread-blocking pattern P4 is spaced apart from the first spread-blocking pattern P3 in the first and second directions D1 and D2 to be alternately disposed with the first spread-blocking pattern P3. The sealing member 400 and the seal spacer 420 are in the seal line forming area SA including the first and second spread-blocking patterns P3 and P4. When the first and second spread-blocking patterns P3 and P4 face (e.g., overlap) each other, the seal spacer 420 is between the first and second spread-blocking patterns P3 and P4 so that a thickness of the seal line forming area SA is larger than that of a display area DA of the display panel 503. Thus, the display panel 503 may be entirely bent. In order to reduce or effectively prevent bending the display panel 503, the illustrated exemplary embodiment includes the first and second spread-blocking patterns P3 and P4 are alternately disposed with each other (e.g., not overlapped) and a height of the seal spacer 420 is smaller than that of the seal spacer 420 shown in FIG. 3. Therefore, although the seal spacer 420 is interposed between the first spread-blocking pattern P3 and the second display substrate 203, the display panel 503 has a uniform thickness.

Hereinafter, methods of manufacturing the first display substrate 103 and the second display substrate 203 shown in FIG. 11 will be explained referring to FIG. 11.

The first display substrate 103 shown in FIG. 11 is manufactured via substantially the same processes as the first display substrate 101 explained referring to FIGS. 5A and 5B. In one exemplary embodiment, for example, the first spread-blocking pattern P3 is formed in the first seal line region SSA1 in forming the color filter CF and the first backflow-blocking pattern P1 illustrated referring to FIG. 5A. Thus, any repetitive descriptions will be omitted.

Referring to FIGS. 5B and 11, a pixel electrode PE and the first alignment layer AL1 are formed on the first base substrate 110 on which the color filter CF, the first backflow-blocking pattern P1 and the first spread-blocking pattern P3 are formed. Thus, the first alignment layer AL may be uniformly formed in the first display region SDA1 and the first peripheral region SPA1 by using the first backflow-blocking pattern P1, and the first spread-blocking pattern P3 may reduce or effectively prevent the first alignment layer AL1 from spreading further into the first seal line region SSA1.

The second display substrate 203 shown in FIG. 11 is manufactured via substantially the same processes as the second display substrate 201 explained referring to FIGS. 4A and 4B. In one exemplary embodiment, for example, the second display substrate 203 shown in FIG. 11 is manufactured via the processes explained referring to FIGS. 4A and 4B except that a mask 710 further includes a light-transmissive portion corresponding to the second seal line region SSA2. Thus, any repetitive descriptions will be omitted.

Referring to FIGS. 4A and 11, in forming the second backflow-blocking pattern P2 and the pixel spacer SP, a photo layer 240 receiving the light through the light-transmissive portion 712 of the mask 710 is developed to form the second spread-blocking pattern P4 in the second seal line region SSA2. The second alignment layer AL2 is formed on the second base substrate 210 on which the pixel spacer SP, the second backflow-blocking pattern P2 and the second spread-blocking pattern P4 are formed. Thus, the second alignment layer AL2 may be uniformly formed in the second display region SDA2 and the second peripheral region SPA2 by using the second backflow-blocking pattern P2, and the second spread-blocking pattern P4 may reduce or effectively prevent the second alignment layer AL2 from spreading into the second seal line region SSA2.

The first and second display substrates 103 and 203 explained referring to the above descriptions are combined with each other via an assembling method described in FIG. 6 to manufacture the display panel 503 shown in FIG. 11.

According to the illustrated exemplary embodiment, the first and second spread-blocking patterns P3 and P4 are used in addition to the first and second backflow-blocking patterns P1 and P2 to improve reliability of forming the first and second alignment layers AL1 and AL2.

FIG. 12 is a cross-sectional view illustrating still another exemplary embodiment of a display panel according to the invention.

A plane structure of a display panel 504 shown in FIG. 12 is substantially the same as the display panel 503 shown in FIG. 10. Thus, a cross-sectional structure of the display panel 504 shown in FIG. 12 will be illustrated referring to FIG. 10.

Referring to FIG. 12 with FIG. 10, the display panel 504 includes a first display substrate 104, a second display substrate 204, the liquid crystal layer 300 and the sealing member 400. The display panel 504 further includes the seal spacer 420 in the sealing member 400.

The first display substrate 104 includes the switching element SW, an organic insulating layer 170, the pixel electrode PE, the first backflow-blocking pattern P1, the first spread-blocking pattern P3 and the first alignment layer AL1. The first display substrate 104 is substantially the same as the first display substrate 103 shown in FIG. 11 except for including the organic insulating layer 170 in place of the color filter CF. Thus, any repetitive descriptions will be omitted.

The organic insulating layer 170 is on a passivation layer 160 covering the switching element SW. The organic insulating layer 170 may planarize a first display region SDA1. The pixel electrode PE and the first alignment layer AL1 are on the organic insulating layer 170. The first backflow-blocking pattern P1 and the first spread-blocking pattern P3 are in substantially the same layer as the organic insulating layer 170.

The second display substrate 204 includes the light-blocking pattern 220a and 220b, the color filter CF, the overcoating layer 230, the common electrode CE, the second backflow-blocking pattern P2 and the second spread-blocking pattern P4. The second display substrate 204 is substantially the same as the second display substrate 203 shown in FIG. 11 except for further including the color filter CF. Thus, any repetitive descriptions will be omitted.

The color filter CF is in a unit region divided by a matrix portion 220a of the light-blocking pattern 220a and 220b. The matrix portion 220a is in the second display region SDA2. A region including the color filter CF may be a region including (e.g., overlapping) the pixel electrode PE, respectively. The common electrode CE is on the overcoating layer 230 which is on the light-blocking pattern 220a and 220b and the color filter CF.

The second backflow-blocking pattern P2 and the second spread-blocking pattern P4 are on the common electrode CE and in substantially the same layer as a pixel spacer SP in the second display region SDA2. The second backflow-blocking pattern P2 and the second spread-blocking pattern P4 are substantially the same as the second backflow-blocking pattern P2 and the second spread-blocking pattern P4 explained referring to FIG. 11, and thus any repetitive descriptions will be omitted. The second alignment layer AL2 is on a second base substrate 210 including the pixel spacer SP, the second backflow-blocking pattern P2 and the second spread-blocking pattern P4.

A method of manufacturing the second display substrate 204 shown in FIG. 12 is substantially the same as the method of manufacturing the second display substrate 203 explained referring to FIG. 11 except for further including a step for forming the color filter CF after forming the light-blocking pattern 220a and 220b. Thus, any repetitive descriptions will be omitted.

A method of manufacturing the first display substrate 104 shown in FIG. 12 is substantially the same as the method of manufacturing the first display substrate 103 explained referring to FIG. 12 except for forming an organic layer in place of a color filter layer after forming the passivation layer 160 and patterning the organic layer to form the organic insulating layer 170, the first backflow-blocking pattern P1 and the first spread-blocking pattern P3. Thus, any repetitive descriptions will be omitted.

After manufacturing the first and second display substrates 104 and 204, the first and second display substrates 104 and 204 are combined with each other by the sealing member 400 via substantially the same process as explained above referring to FIG. 6. Thus, any repetitive descriptions will be omitted. Therefore, the display panel 504 shown in FIG. 12 is manufactured.

According to the illustrated exemplary embodiment, the first and second spread-blocking patterns P3 and P4 are used in addition to the first and second backflow-blocking patterns P1 and P2 to improve reliability in forming the first and second alignment layers AL1 and AL2. In addition, the first backflow-blocking pattern P1 and the first spread-blocking pattern P3 are formed in forming the organic insulating layer 170, and the second backflow-blocking pattern P2 and the second spread-blocking pattern P4 are formed in forming the pixel spacer SP, without additional processes.

Figure 13:
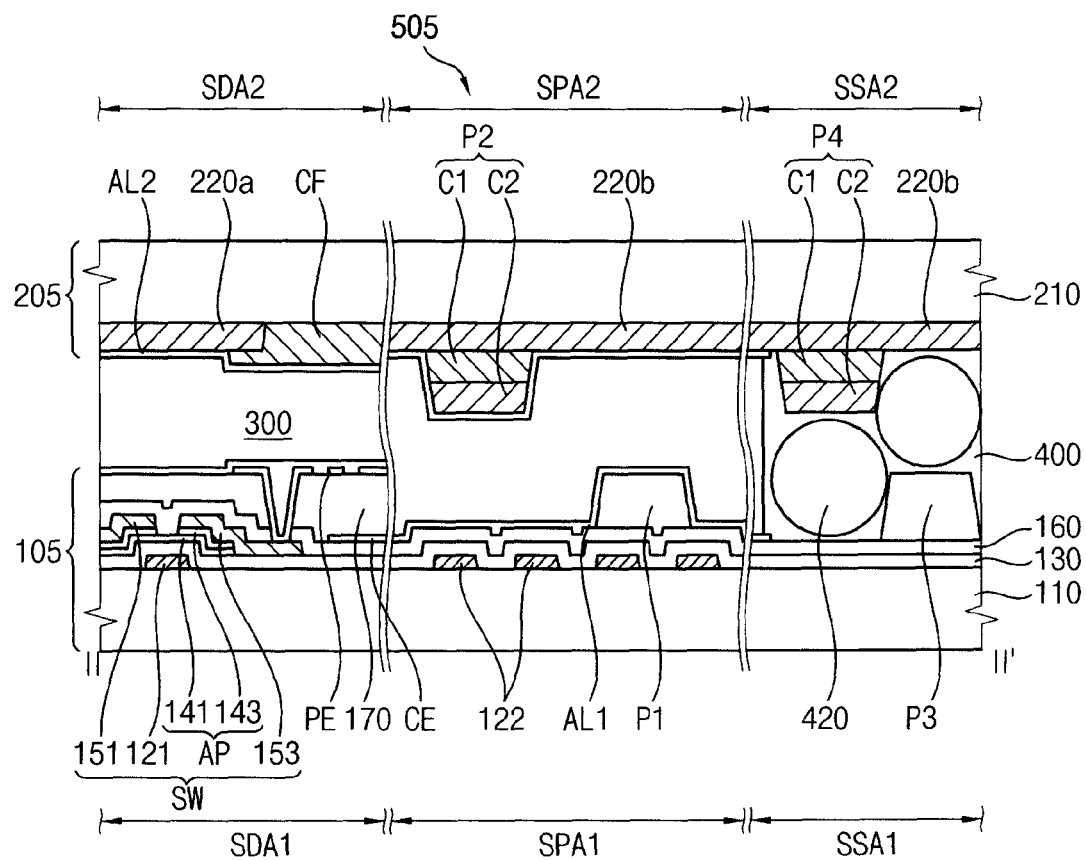
FIG. 13 is a cross-sectional view illustrating still another exemplary embodiment of a display panel according to the invention.

FIG. 13 is a cross-sectional view illustrating still another exemplary embodiment of a display panel according to the invention.

A plane structure of a display panel 505 shown in FIG. 13 is substantially the same as the display panel 503 shown in FIG. 10. Thus, a cross-sectional structure of the display panel 505 shown in FIG. 13 will be illustrated referring to FIG. 13 with FIG. 10.

Referring to FIG. 13 with FIG. 10, the display panel 505 includes a first substrate 105, a second display substrate 205, the liquid crystal layer 300 and the sealing member 400. The display panel 505 further includes the seal spacer 420 in the sealing member 400.

The first display substrate 105 includes the switching element SW, the common electrode CE, the organic insulating layer 170, the pixel electrode PE, the first backflow-blocking pattern P1, the first spread-blocking pattern P3 and the first alignment layer AL1. The first display substrate 105 is substantially the same as the first display substrate 103 shown in FIG. 11 except for including the organic insulating layer 170 in place of the color filter CF, further including the common electrode CE, and including the pixel electrode PE having a different shape from the pixel electrode PE shown in FIG. 11. Thus, any repetitive descriptions will be omitted.

The common electrode CE is on a passivation layer 160 covering the source electrode 151 and the drain electrode 153. The common electrode CE is insulated from a data line connected to the source electrode 151, and a gate line connected to a gate electrode 121 and crossing the data line, so that the common electrode CE is in a first display region SDA1 of a first base substrate 110 without overlapping with the gate line and the data line. The organic insulating layer 170 is on the common electrode CE. The first backflow-blocking pattern P1 and the first spread-blocking pattern P3 are in substantially the same layer as the organic insulating layer 170.

The pixel electrode PE is on the organic insulating layer 170. The pixel electrode PE includes a plurality of slit electrodes. The pixel electrode PE is insulated from the common electrode CE by the organic insulating layer 170. A horizontal electric field is formed in the liquid crystal layer 300 by the slit electrodes and the common electrode CE.

The first alignment layer AL1 is on the first base substrate 110 including the pixel electrode PE, and overlaps the first backflow-blocking pattern P1. An end portion of the first alignment layer AL1 may be in the first seal line region SSA1.

The second display substrate 205 includes a light-blocking pattern 220a and 220b, the color filter CF, the second backflow-blocking pattern P2, the second spread-blocking pattern P4 and the second alignment layer AL2.

The color filter CF is in a unit region divided by a matrix portion 220a of the light-blocking pattern 220a and 220b. The matrix portion 220a is in the second display region SDA2.

The second backflow-blocking pattern P2 is on an outer portion 220b of the light-blocking pattern 220a and 220b. The outer portion 220b is in a second peripheral region SPA2. The second backflow-blocking pattern P2 includes a first layer C1 and a second layer C2. The first layer C1 may be substantially the same layer as the color filter CF. The second layer C2 may be substantially the same layer as a color layer different from the color filter CF. The color filter CF is in each of pixels Px shown in FIG. 2 and may represent red, green or blue. In one exemplary embodiment, for example, when the color filter CF is a blue color filter representing blue, a red color filter (not shown) and a green color filter (not shown) are in each of the unit regions adjacent to the unit region including the blue color filter. Then, the first layer C1 is in substantially the same layer as the blue color filter and the second layer C2 may be in substantially the same layer as the red color filter or the green color filter.

Although the second backflow-blocking pattern P2 shown in FIG. 13 has a double layered structure including the first and second layers C1 and C2, the second backflow-blocking pattern P2 may have a triple layered structure further including a third layer (not shown) with the first and second layers C1 and C2. The third layer may represent different color from the first and second layers C1 and C2.

The second spread-blocking pattern P4 is on the outer portion 220b in a second seal line region SSA2. The second spread-blocking pattern P4 has substantially the same structure as the second backflow-blocking pattern P2 except for being in the second seal line region SSA2. Thus, any repetitive descriptions will be omitted.

The second alignment layer AL2 is on a second base substrate 210 including the light-blocking pattern 220a and 220b, the second backflow-blocking pattern P2 and the second spread-blocking pattern P4. The second alignment layer AL2 is in the second display region SDA2 and the second peripheral region SPA2. Preferably, the second alignment layer AL2 is not in the second seal line region SSA2.

In FIG. 13, the common electrode CE is on the first base substrate 110 so that an electric short circuit between the first and second display substrates 105 and 205 may be fundamentally reduced or effectively prevented, although a electrode pattern including substantially the same layer as the pixel electrode PE may be in the first peripheral region SPA 1.

Figure 14A:
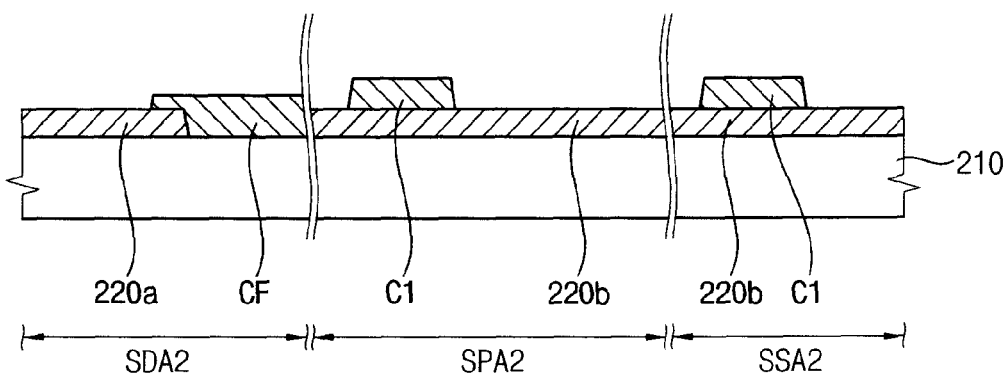
FIGS. 14A, 14B and 15 are cross-sectional views illustrating an exemplary embodiment of a method of manufacturing the display panel shown in FIG. 13.
Figure 14B:
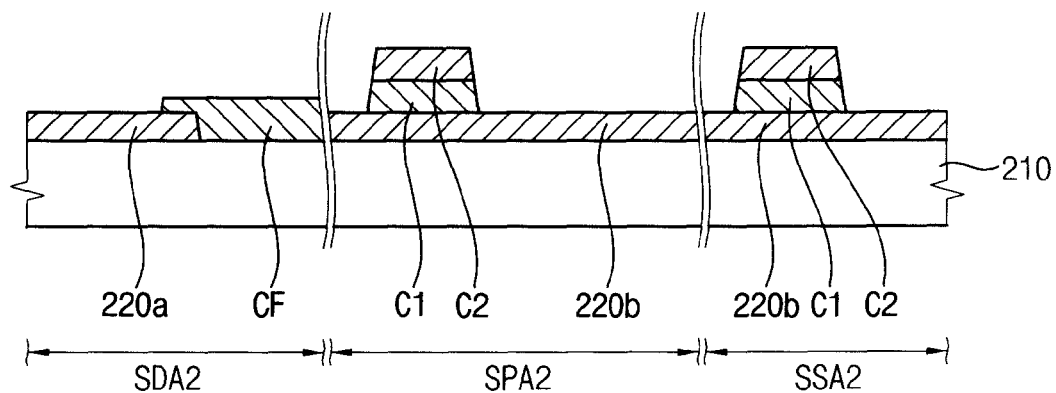
Figure 15:
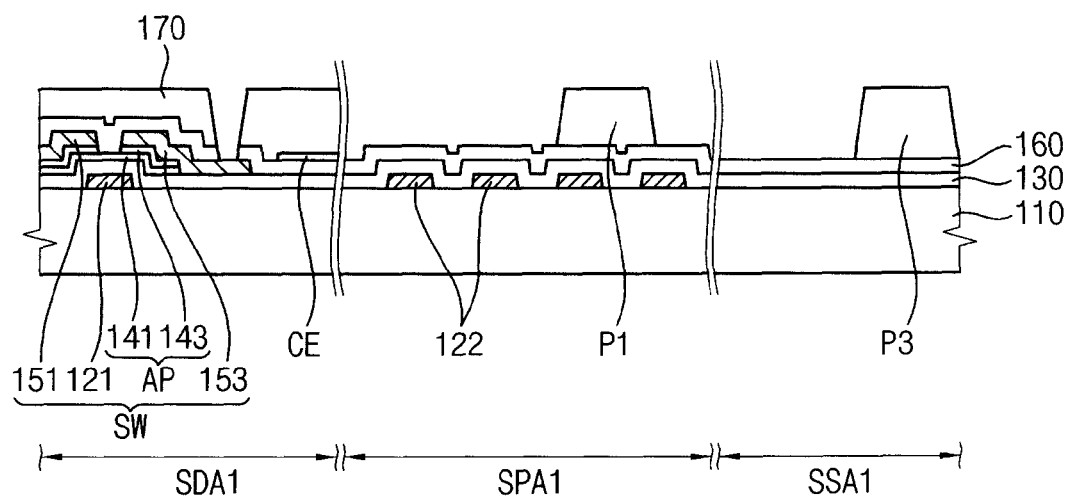

FIGS. 14A, 14B and 15 are cross-sectional views illustrating an exemplary embodiment of a method of manufacturing the display panel 505 shown in FIG. 13.

Particularly, FIGS. 14A and 14B are cross-sectional views illustrating an exemplary embodiment of a method of manufacturing the second display substrate 205, and FIG. 15 is a cross-sectional view illustrating an exemplary embodiment of a method of manufacturing the first display substrate 105.

Referring to FIG. 14A, the light-blocking pattern 220a and 220b is formed on the second base substrate 210, and a first color filter layer is formed on the second base substrate 210 on which the light-blocking pattern 220a and 220b is formed. The first color filter layer is patterned to form the color filter CF, the first layer C1 of the second backflow-blocking pattern P2 and the first layer C1 of the second spread-blocking pattern P4.

Referring to FIG. 14B, a second color filter layer is formed on the second base substrate 210 on which the color filter CF, the first layers C1 of the second backflow-blocking pattern P2 and the second spread-blocking pattern P4 are formed. The second color filter layer is patterned to form a different color filter from the color filter CF in a unit region adjacent to the unit region in which the color filter CF is formed. In addition, the second color filter layer is patterned to form the second layers C2 of the second backflow-blocking pattern P2 and the second spread-blocking pattern P4. Thus, the second backflow-blocking pattern P2 and the second spread-blocking pattern P4 are formed.

The second alignment layer AL2 is formed on the second base substrate 210 on which the second backflow-blocking pattern P2 and the second spread-blocking pattern P4 are formed so that the second display substrate 205 shown in FIG. 13 is manufactured.

Referring to FIG. 15, the switching element SW and the passivation layer 160 are formed on the first base substrate 110, and the common electrode CE is formed on the passivation layer 160. An organic layer is formed on the first base substrate 110 on which the common electrode CE is formed, and the organic layer is patterned to form the organic insulating layer 170, the first backflow-blocking pattern P1 and the first spread-blocking pattern P3.

Then, the pixel electrode PE and the first alignment layer AL1 are formed on the first base substrate 110 on which the organic insulating layer 170, the first backflow-blocking pattern P1 and the first spread-blocking pattern P3 are formed. Thus, the first display substrate 105 shown in FIG. 13 is manufactured.

The first and second display substrates 105 and 205 are combined with each other by the sealing member 400 via substantially the same process as explained above referring to FIG. 6 so that the display panel 505 shown in FIG. 13 is manufactured.

According to the illustrated exemplary embodiment, the first and second spread-blocking patterns P3 and P4 are used in addition to the first and second backflow-blocking patterns P1 and P2 to improve reliability in forming the first and second alignment layers AL1 and AL2.

Figure 16:
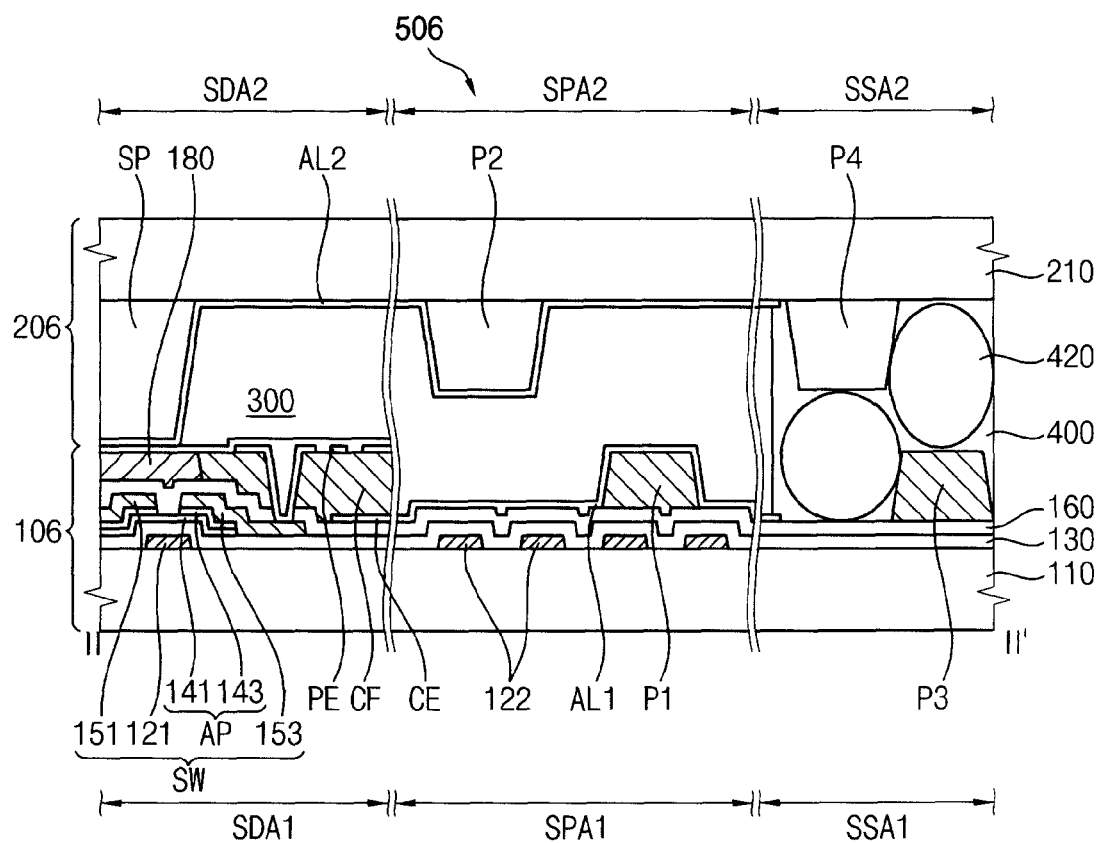
FIG. 16 is a cross-sectional view illustrating still another exemplary embodiment of a display panel according to the invention.

FIG. 16 is a cross-sectional view illustrating still another exemplary embodiment of a display panel according to the invention.

A plane structure of a display panel 506 shown in FIG. 16 is substantially the same as the display panel 503 shown in FIG. 10. Thus, a cross-sectional structure of the display panel 506 will be illustrated referring to FIG. 10 with FIG. 16.

Referring to FIG. 16 with FIG. 10, the display panel 506 includes a first display substrate 106, a second display substrate 206, the liquid crystal layer 300 and the sealing member 400. The display panel 506 further includes the seal spacer 420 disposed in the sealing member 400.

The first display substrate 106 is substantially the same as the first display substrate 103 explained referring to FIG. 11 except for further including the common electrode CE and a light-blocking pattern 180, and including the pixel electrode PE having different shape from the pixel electrode PE shown in FIG. 11. Thus, any repetitive descriptions will be omitted.

The common electrode CE is on a passivation layer 160 covering the switching element SW. The color filter CF is on the common electrode CE, and the light-blocking pattern 180 is on the passivation layer 160 in a region corresponding to the switching element SW. Each of the first backflow-blocking pattern P1 and the first spread-blocking pattern P3 of the first display substrate 106 is in substantially the same layer as the color filter CF.

In addition, the light-blocking pattern 180 is in a region corresponding to a gate line connected to a gate electrode 121 and a data line connected to a source electrode 151, as well as the switching element SW.

The pixel electrode PE is on the color filter CF. The pixel electrode PE includes a plurality of slit electrodes. The pixel electrode PE is insulated from the common electrode CE by the color filter CF. A horizontal electric field is formed in the liquid crystal layer 300 by the slit electrodes and the common electrode CE.

The second display substrate 206 includes the pixel spacer SP, the second backflow-blocking pattern P2 and the second spread-blocking pattern P4.

Each of the pixel spacer SP, the second backflow-blocking pattern P2 and the second spread-blocking pattern P4 directly contacts the second base substrate 210. The first display substrate 106 includes all of the color filter CF, the light-blocking pattern 180 and the common electrode CE so that the pixel spacer SP, the second backflow-blocking pattern P2 and the second spread-blocking pattern P4 are directly on the second base substrate 210. Although an electrode pattern (not shown) in the same layer as the pixel electrode PE is in the first peripheral region SPA1, the common electrode CE is on the first base substrate 110 so that the electric short circuit between the common electrode CE and the electrode pattern is not generated.

The second alignment layer AL2 directly contacts each of the pixel spacer SP, the second backflow-blocking pattern P2, the second spread-blocking pattern P4 and a surface of the second base substrate 210.

Figure 17:
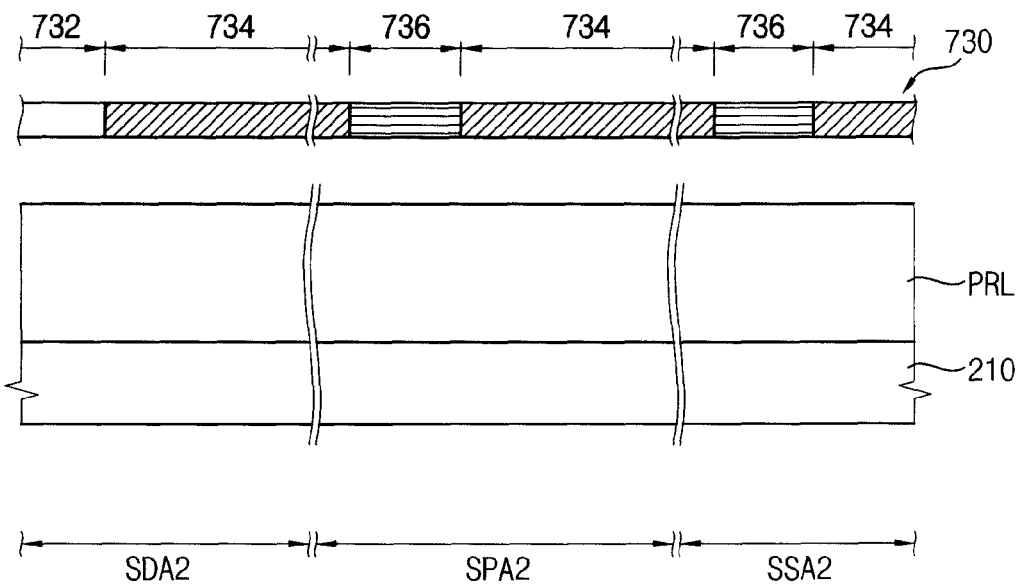
FIGS. 17 and 18 are cross-sectional views illustrating an exemplary embodiment of a method of manufacturing a first display substrate and a second display substrate shown in FIG. 16.
Figure 18:
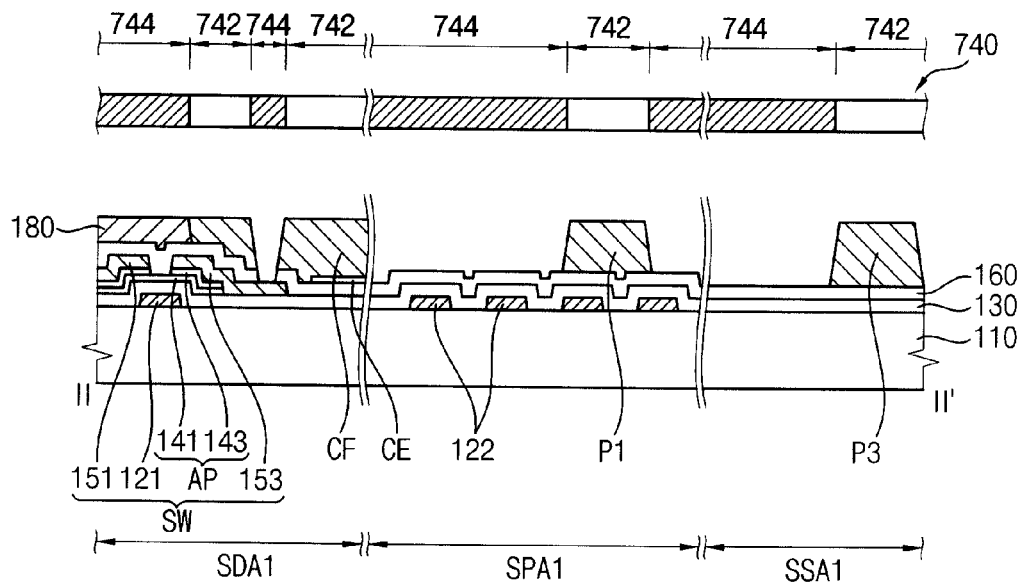

FIGS. 17 and 18 are cross-sectional views illustrating an exemplary embodiment of a method of manufacturing a first display substrate and a second display substrate shown in FIG. 16.

In particular, FIG. 17 is a cross-sectional view illustrating an exemplary embodiment of a method of manufacturing the second display substrate 206, and FIG. 18 is a cross-sectional view illustrating an exemplary embodiment of a method of manufacturing the first display substrate 106.

Referring to FIG. 17, a photo layer PRL is formed on the second base substrate 210 and a mask 730 is disposed over the photo layer PRL. The photo layer PRL includes a negative-type photoresist layer which is hardened by light.

The mask 730 includes a light-transmissive portion 732, a light-blocking portion 734 and a light-transflective portion 736. The light-transmissive portion 732 corresponds to a forming region of the pixel spacer SP. The light-transflective portion 736 corresponds to forming regions of the second backflow-blocking pattern P2 and the second spread-blocking pattern P4. A light intensity passing through the light-transmissive portion 732 is relatively more than a light intensity passing through the light-transflective portion 736, so that a height of a remaining region on the second base substrate 210 of the photo layer PRL facing the light-transmissive portion 732 will be larger than that of the photo layer PRL facing the light-transflective portion 736, after developing the photo layer PRL. The remaining region except for the light-transmissive portion 732 and the light-transflective portion 736 corresponds to the light-blocking portion 734, and the photo layer PRL facing the light blocking part 734 is completely removed by developing the photo layer PRL. Thus, the pixel spacer SP, the second backflow-blocking pattern P2 and the second spread-blocking pattern P4 are formed.

Then, the second alignment layer AL2 is formed on the second base substrate 210 on which the pixel spacer SP, the second backflow-blocking pattern P2 and the second spread-blocking pattern P4 are formed, so that the second display substrate 206 shown in FIG. 16 is manufactured.

Referring to FIG. 18, after forming the switching element SW, the metal pattern 122, and the passivation layer 160 covering the switching element SW and the metal pattern 122 on the first base substrate 110, the common electrode CE is formed on the first base substrate 110.

The light-blocking pattern 180 is formed on the first base substrate 110 on which the common electrode CE is formed, and a color filter layer is formed on the first base substrate 110 on which the light-blocking pattern 180 is formed.

A mask 740 is disposed over the color filter layer, and the color filter layer partially receives the light according to regions and is developed to form the color filter CF, the first backflow-blocking pattern P1 and the first spread-blocking pattern P3. The mask 740 includes a light-transmissive portion 742 corresponding to forming regions of the color filter CF, the first backflow-blocking pattern P1 and the first spread-blocking pattern P3, and a light-blocking portion 744 corresponding to the remaining region except for the light-transmissive portion 742.

The pixel electrode PE is formed on the first base substrate 110 on which the color filter CF, the first backflow-blocking pattern P1 and the first spread-blocking pattern P3 are formed, and the first alignment layer AL1 is formed on the first base substrate 110 on which the pixel electrode PE is formed. Thus, the first display substrate 106 shown in FIG. 16 is manufactured.

The first and second display substrates 106 and 206 manufactured via the above mentioned processes are combined with each other via substantially the same process as explained above referring to FIG. 6, so that the display panel 506 shown in FIG. 16 is manufactured.

Although each of the first backflow-blocking pattern P1 and the first spread-blocking pattern P3 shown in FIG. 16 has a single layered structure, each of the first backflow-blocking pattern P1 and the first spread-blocking pattern P3 may be a double layered structure including two color filter layers different from each other such as the second backflow-blocking pattern P2 and second spread-blocking pattern P4 shown in FIG. 13, or a triple layered structure including three color filter layers different from each other.

According to the illustrated exemplary embodiment, the first and second spread-blocking patterns P3 and P4 are used in addition to the first and second backflow-blocking patterns P1 and P2 so that reliability in forming the first and second alignment layers AL1 and AL2 may be improved.

Figure 19:
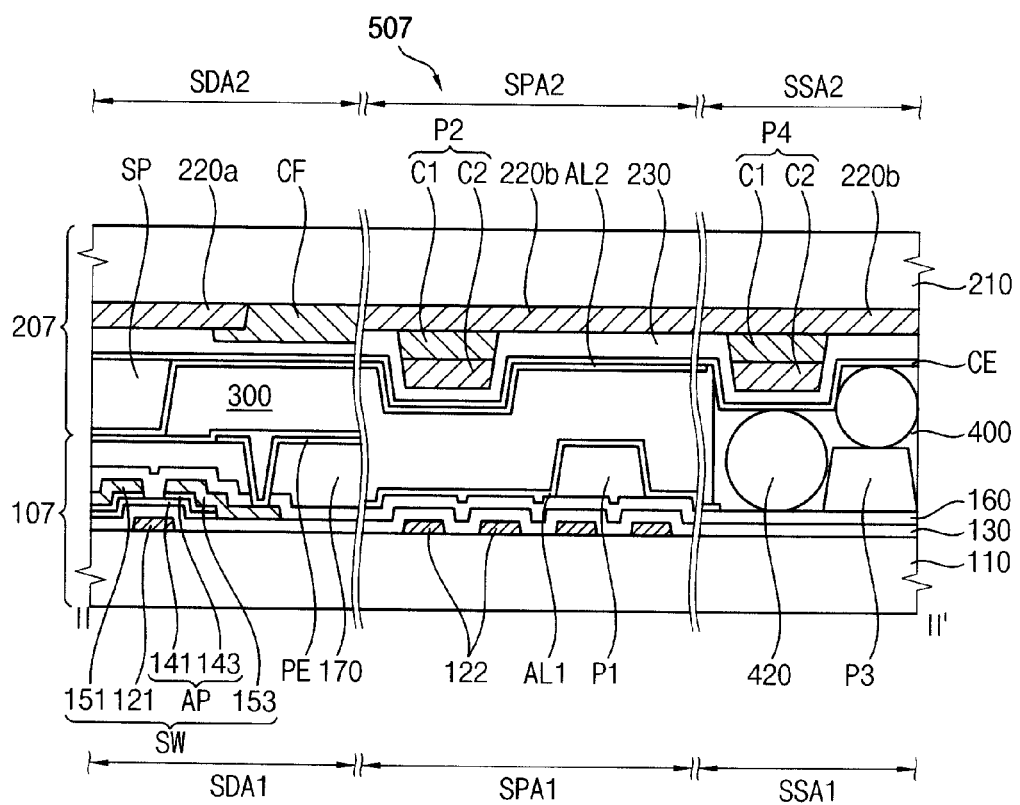
FIG. 19 is a cross-sectional view illustrating still another exemplary embodiment of a display panel according to the invention.

FIG. 19 is a cross-sectional view illustrating still another exemplary embodiment of a display panel according to the invention.

A plane structure of a display panel 507 shown in FIG. 19 is substantially the same as the display panel 503 shown in FIG. 10. Thus, the display panel 507 is illustrated referring to FIGS. 10 and 19.

Referring to FIG. 19 with FIG. 10, the display panel 507 includes a first display substrate 107, a second display substrate 207, the liquid crystal layer 300 and the sealing member 400. The display panel 507 further includes the seal spacer 420 disposed in the sealing member 400.

The first display substrate 107 includes the first backflow-blocking pattern P1, the first spread-blocking pattern P3 and the first alignment layer AL1. The first display substrate 107 is substantially the same as the first display substrate 104 shown in FIG. 12. Thus, any repetitive descriptions will be omitted.

The second display substrate 207 includes the light-blocking pattern 220a and 220b, the color filter CF, the second backflow-blocking pattern P2, the second spread-blocking pattern P4, the overcoating layer 230, the common electrode CE and the second alignment layer AL2. The second display substrate 207 is substantially the same as the second display substrate 205 shown in FIG. 13 except for further including the overcoating layer 230. Thus, any repetitive descriptions will be omitted.

Although the overcoating layer 230 may planarize a surface of the second base substrate 210 including the light-blocking pattern 220a and 220b and the color filter CF, the heights of the second backflow-blocking pattern P2 and the second spread-blocking pattern P4 in the same layer as the color filter CF are larger than those of other patterns so that a surface of the overcoating layer 230 corresponding to a region of the second backflow-blocking pattern P2 and the second spread-blocking pattern P4 may be relatively protruded, compared to a surface of the overcoating layer 230 corresponding to regions in which the other patterns are formed. Substantially, the second backflow-blocking pattern P2 and the second spread-blocking pattern P4 may reduce or effectively prevent the second alignment layer AL2 from flowing backward into the second display region SPA2 or further spreading to the second seal line region SSA2, with the overcoating layer 230 on the second backflow-blocking pattern P2 and the second spread-blocking pattern P4. The common electrode CE is on the overcoating layer 230 and the second alignment layer AL2 is on the common electrode CE.

When an electrode pattern (not shown) is in a first peripheral region SPA1 of the first display substrate 107 and is in substantially the same layer as the pixel electrode PE, the common electrode CE on the second backflow-blocking pattern P2 may generate an electric short circuit with the electrode pattern so that the electrode pattern is not preferable in the first peripheral region SPA1 facing the second backflow-blocking pattern P2.

A method of manufacturing the first display substrate 107 is substantially the same as the method of manufacturing the first display substrate 104 explained referring to FIG. 12. Thus, any repetitive descriptions will be omitted.

In addition, a method of manufacturing the second display substrate 207 is substantially the same as the method of manufacturing the second display substrate 105 explained referring to FIGS. 14A and 14B, except that the overcoating layer 230 is further formed on the second base substrate 210 on which the light-blocking pattern 220a and 220b, the color filter CF, the second backflow-blocking pattern P2 and the second spread-blocking pattern P4 are formed. Thus, any repetitive descriptions will be omitted.

After forming the overcoating layer 230, the common electrode CE is formed and the pixel spacer SP is formed on the second base substrate 210 on which the common electrode CE is formed. The second alignment layer AL2 is formed on the second base substrate 210 on which the pixel spacer SP is formed, so that the second display substrate 207 shown in FIG. 19 is manufactured.

The first and second display substrates 107 and 207 manufactured via the above mentioned processes are combined with each other via substantially the same process as explained above referring to FIG. 6, so that the display panel 507 shown in FIG. 17 is manufactured.

Although each of the second backflow-blocking pattern P2 and the second spread-blocking pattern P4 shown in FIG. 19 has a double layered structure, each of the second backflow-blocking pattern P2 and the second spread-blocking pattern P4 may be a single layered structure or a multilayered structure including three color filter layers.

Although not shown in figures, when an electrode pattern in substantially the same layer as the pixel electrode PE is formed in a first peripheral region SPA1, the common electrode CE preferable includes a hole pattern exposing the overcoating layer 230 disposed on the second backflow-blocking pattern P2.

Figure 20:
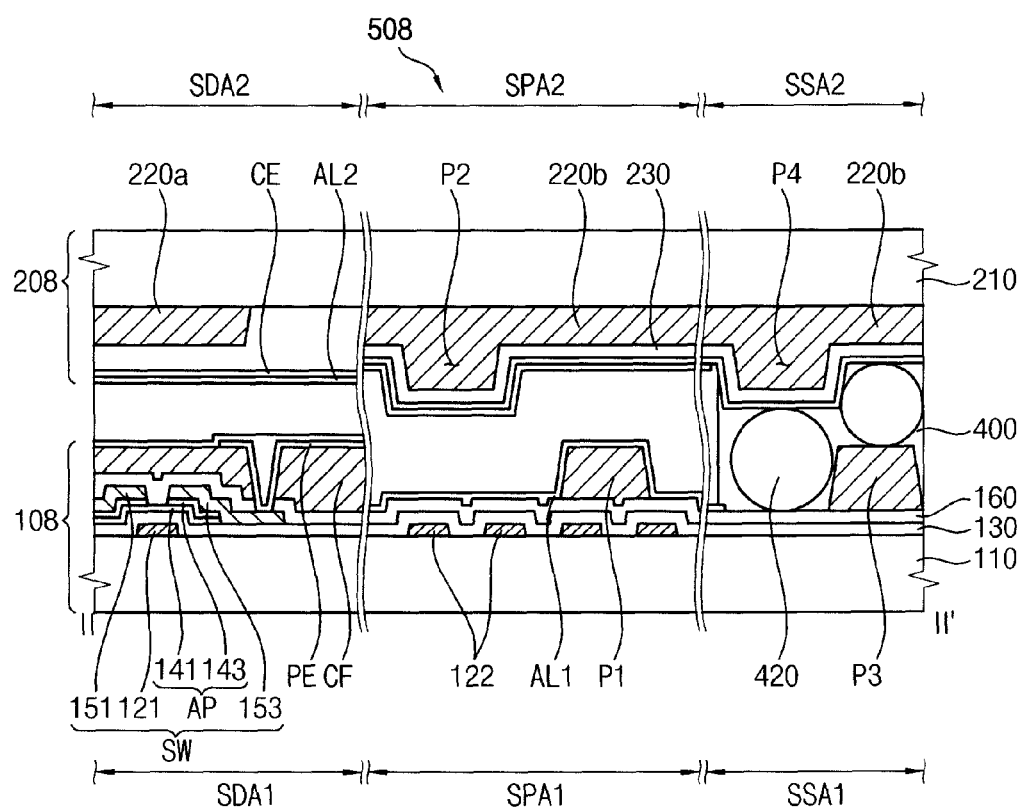
FIG. 20 is a cross-sectional view illustrating a still another exemplary embodiment of display panel according to the invention.

FIG. 20 is a cross-sectional view illustrating still another exemplary embodiment of a display panel according to the invention.

A plane structure of a display panel 508 shown in FIG. 20 is substantially the same as the display panel 503 shown in FIG. 10. Thus, the display panel 508 shown in FIG. 20 will be illustrated referring to FIGS. 10 and 20.

Referring to FIG. 20 with FIG. 10, the display panel 508 includes a first display substrate 108, a second display substrate 208, the liquid crystal layer 300 and the sealing member 400. The display panel 508 further includes the seal spacer 420 disposed in the sealing member 400.

The first display substrate 108 includes the first backflow-blocking pattern P1, the first spread-blocking pattern P3 and the first alignment layer AL1. The first display substrate 108 is substantially the same as the first display substrate 103 shown in FIG. 11. In addition, a method of manufacturing the first display substrate 106 is substantially the same as the method of manufacturing the first display substrate 103 explained referring to FIG. 11. Thus, any repetitive descriptions will be omitted.

The second display substrate 208 includes the light-blocking pattern 220a and 220b, the second backflow-blocking pattern P2, the second spread-blocking pattern P4, the overcoating layer 230, the common electrode CE and the second alignment layer AL2. The light-blocking pattern 220a and 220b and the second backflow-blocking pattern P2 are substantially the same as explained in the second display substrate 202 shown in FIG. 7. Thus, any repetitive descriptions will be omitted.

The second spread-blocking pattern P4 is integrally formed with an outer portion 220b of the light-blocking pattern 220a and 220b in a second seal line region SSA2, such that the second spread-blocking pattern P4 and the outer portion 220b are a single unitary indivisible element. The second spread-blocking pattern P4 is formed in forming the light-blocking pattern 220a and 220b and the second backflow-blocking pattern P2.

The overcoating layer 230 is on a second base substrate 210 including the light-blocking pattern 220a and 220b, the second backflow-blocking pattern P2 and the second spread-blocking pattern P4.

Although the overcoating layer 230 may planarize a surface of the second base substrate 210 including the light-blocking pattern 220a and 220b, the heights of the second backflow-blocking pattern P2 and the second spread-blocking pattern P4 in the same layer as the color filter CF are larger than those of other patterns so that a surface of the overcoating layer 230 corresponding to a region including the second backflow-blocking pattern P2 and the second spread-blocking pattern P4 may be relatively protruded, compared to a surface of the overcoating layer 230 corresponding to regions including other patterns of the second display region SDA2. Substantially, the second backflow-blocking pattern P2 and the second spread-blocking pattern P4 may reduce or effectively prevent the second alignment layer AL2 from flowing backward into the second display region SDA2 or further spreading to the second seal line region SSA2, with the overcoating layer 230 on the second backflow-blocking pattern P2 and the second spread-blocking pattern P4. The common electrode CE is on the overcoating layer 230 and the second alignment layer AL2 is on the common electrode CE.

A method of manufacturing the second display substrate 208 is substantially the same as the method of manufacturing the second display substrate 102 explained referring to FIG. 8, except that the overcoating layer 230 is further formed on the second base substrate 210 on which the light-blocking pattern 220a and 220b, the second backflow-blocking pattern P2 and the second spread-blocking pattern P4 are formed. Thus, any repetitive descriptions will be omitted.

After forming the overcoating layer 230, the common electrode CE and the second alignment layer AL2 are sequentially formed, so that the second display substrate 208 shown in FIG. 20 is manufactured.

The first and second display substrates 108 and 208 manufactured via the above processes are combined with each other via substantially the same process as explained above referring to FIG. 6, so that the display panel 508 shown in FIG. 20 is manufactured.

Although each of the first backflow-blocking pattern P1 and the first spread-blocking pattern P3 shown in FIG. 20 has a single layered structure, each of the first backflow-blocking pattern P1 and the first spread-blocking pattern P3 may have a multilayered structure including two or three color filter layers. Although not shown in figures, when an electrode pattern including substantially the same layer as the pixel electrode is formed in a first peripheral region SPA1, the common electrode CE preferably includes a hole pattern exposing the overcoating layer 230 disposed on the second backflow-blocking pattern P2.

Figure 21:
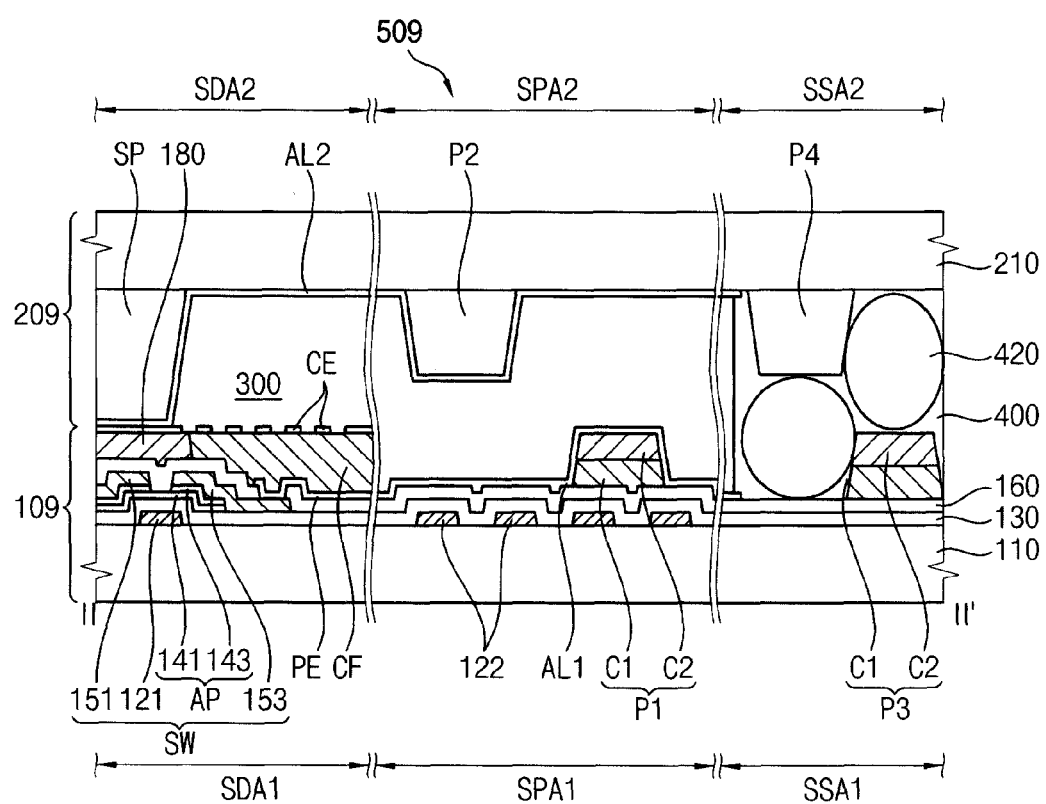
FIG. 21 is a cross-sectional view illustrating still another exemplary embodiment of a display panel according to the invention.

FIG. 21 is a cross-sectional view illustrating still another exemplary embodiment of a display panel according to the invention.

A plane structure of a display panel 509 shown in FIG. 21 is substantially the same as the display panel 503 shown in FIG. 10. Thus, the display panel 509 shown in FIG. 21 will be illustrated referring to FIGS. 10 and 21.

Referring to FIG. 21, the display panel 509 includes a first display substrate 109, a second display substrate 209, the liquid crystal layer 300 and the sealing member 400. The display panel 509 further includes the seal spacer 420 disposed in the sealing member 400.

The first display substrate 109 includes the switching element SW, the pixel electrode PE, the color filter CF, the common electrode CE, the first backflow-blocking pattern P1, the first spread-blocking pattern P3 and the first alignment layer AL1.

The pixel electrode PE is on a passivation layer 160 covering the source electrode 151 and the drain electrode 153. The passivation layer 160 includes a hole partially exposing the drain electrode 153, and the pixel electrode PE contacts with the drain electrode 153 through the hole.

The color filter CF is on a first base substrate 110 including the pixel electrode PE. The color filter CF directly contacts the passivation layer 160 and the pixel electrode PE. The color filter CF is electrically separated from the switching element SW without a contact hole exposing the switching element SW, and the pixel electrode PE and the common electrode CE are insulated from each other by the color filter CF.

The first backflow-blocking pattern P1 includes the first color layer C1 including substantially the same layer as the color filter CF, and the second color layer C2 including different layer from the color filter CF. The second color layer C2 is in substantially the same layer as a color filter adjacent to the color filter CF.

In addition, the first spread-blocking pattern P3 includes the first color layer C1 and the second color layer C2. The first spread-blocking pattern P3 may be formed in forming the first backflow-blocking pattern P1.

Although each of the first backflow-blocking pattern P1 and the first spread-blocking pattern P3 shown in FIG. 21 has a double layered structure, each of the first backflow-blocking pattern P1 and the first spread-blocking pattern P3 may have a single layered structure shown in FIG. 11 or a triple layered structure further including a third color layer (not shown) formed on the second color layer C2.

The common electrode CE is on the color filter CF. The common electrode CE includes a plurality of slit electrodes. The common electrode CE is insulated from the pixel electrode PE and the switching element SW by the color filter CF. A horizontal electric field is formed in the liquid crystal layer 300 by the slit electrodes and the pixel electrode PE.

The first alignment layer AL1 is in the first display region SDA1 and the first peripheral region SPA1. The first alignment layer AL1 is on the common electrode CE and the first backflow-blocking pattern P1.

The second display substrate 209 is substantially the same as the second display substrate 206 shown in FIG. 16. In addition, a method of manufacturing the second display substrate 209 is substantially the same as the method illustrated referring to FIG. 17. Thus, any repetitive descriptions will be omitted.

Hereinafter, a method of manufacturing the first display substrate 109 will be simply illustrated referring to FIG. 21. After the switching element SW and the passivation layer 160 are sequentially formed on the first base substrate 110, the passivation layer 160 is patterned to form a hole partially exposing the drain electrode 153 in the passivation layer 160. The pixel electrode PE is formed on the passivation layer 160 in which the hole is formed, and the color filter CF, the first backflow-blocking pattern P1 and the first spread-blocking pattern P3 are formed on the first base substrate 110 on which the pixel electrode PE is formed. After forming the common electrode CE on the color filter CF, the first alignment layer AL1 is formed so that the first display substrate 109 shown in FIG. 21 is manufactured.

The first and second display substrates 109 and 209 manufactured via the above processes are combined with each other via substantially the same process as explained above referring to FIG. 6, so that the display panel 509 shown in FIG. 21 is manufactured.

According to the invention, the backflow-blocking pattern is formed in a peripheral region of at least one of two display substrates of the display panel to reduce or effectively prevent an end portion of the alignment layer, particularly in the corner region of the display substrate, from rolling toward the display region in forming the alignment layer. The backflow-blocking pattern is simultaneously formed in forming a pixel pattern of a pixel in the display region so that the number of manufacturing processes for the display panel may be prevented from increasing.

In addition, the spread-blocking pattern is additionally formed in a seal line region including a sealing member, so that the spread-blocking pattern may reduce or effectively prevent the alignment layer from spreading to the seal line region. When the alignment layer is formed in the seal line region, the coherence between the two display substrates is decreased because an adhesive strength between the alignment layer and the sealing member is weak. However, the spread-blocking pattern may prevent the alignment layer from spreading to the seal line region.

In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
  a first display substrate comprising:
    a first base substrate including a first display region having a plurality of corner portions, and a first peripheral region;
    a first alignment layer in the first display region and the first peripheral region; and
    a plurality of first dummy patterns disposed on the first base substrate and in the first peripheral region;
  a second display substrate which faces the first display substrate and comprises:
    a second base substrate including a second display region which faces the first display region and has a plurality of corner portions corresponding to the corner portions of the first base substrate, and a second peripheral region; and a second alignment layer in the second display region and the second peripheral region; and a plurality of second dummy patterns disposed on the second base substrate and in the second peripheral region;

wherein at corresponding corner portions of the first and second base substrates, the plural first dummy patterns and the plural second dummy patterns do not overlap in a plan view of the display panel; and each first dummy pattern and each second dummy pattern is defined by:

a curved corner having a curvature and surrounding the corner portion of the display region of the respective base substrate;

a first straight portion extending from a first end of the curved corner, along a first direction, and terminating a predetermined distance from the curved corner to be separated from an adjacent dummy pattern on the respective base substrate in the first direction; and a second straight portion extending from an opposing second end of the curved corner, along a second direction different from the first direction, and terminating a predetermined distance from the curved corner to be separated from an adjacent dummy pattern on the respective base substrate in the second direction, and a sealing member between the first and second display substrates, the sealing member including a curved corner, wherein the curved corner of one of the first dummy patterns of the first display substrate and the curved corner of one of the second dummy patterns of the second display substrate are between the curved corner of the sealing member, and the corresponding corner portions of the first and second display areas, respectively, in the plan view of the display panel.

2. The display panel of claim 1, wherein the first display substrate further comprises a pixel spacer in the first display region, and between the first base substrate and the first alignment layer, wherein the pixel spacer maintains a gap between the first and second display substrates, and wherein the first dummy patterns are in substantially the same layer as the pixel spacer, and is between the first base substrate and the first alignment layer.

3. The display panel of claim 2, wherein the first display substrate further comprises:

a light-blocking pattern including a matrix portion and an outer portion, the matrix portion in the first display region, and the outer portion connected to the matrix portion and in the first peripheral region; and a common electrode on the first base substrate, the light-blocking pattern between the first base substrate and the common electrode, wherein the first dummy patterns and the pixel spacer are between the common electrode and the first alignment layer.

4. The display panel of claim 3, wherein the second display substrate further comprises:

a color filter in the second display region;

a pixel electrode on the second base substrate, the color filter between the second base substrate and the pixel electrode; and the second dummy patterns are substantially the same layer as the color filter, and the one of the second dummy patterns has substantially the same curvature as the sealing member such that the one of the second dummy patterns surrounds the corresponding corner portion of the second display region.

5. The display panel of claim 1, wherein the first display substrate further comprises a light-blocking pattern including a matrix portion and an outer portion, the matrix portion in the first display region, and the outer portion connected to the matrix portion and in the first peripheral region, wherein the first dummy patterns are a single unitary indivisible member with the outer portion of the light-blocking pattern.

6. The display panel of claim 5, wherein the second display substrate further comprises:

a first pixel electrode in the second display region;

a second pixel electrode overlapping the first pixel electrode and including a plurality of slit electrodes; and a switching element connected to the first pixel electrode or the second pixel electrode.

7. The display panel of claim 1, wherein the first display substrate further comprises a color filter in the first display region, and wherein the first dummy patterns are in substantially the same layer as the color filter.

8. The display panel of claim 7, wherein the first display substrate further comprises a pixel electrode on the first base substrate, the color filter between the first base substrate and the pixel electrode.

9. The display panel of claim 7, wherein the second substrate further comprises a pixel electrode which faces the color filter in the first display region.

10. The display panel of claim 1, wherein the second display substrate further comprises:

a pixel electrode in the second display region;

a switching element which is electrically connected to the pixel electrode; and an organic insulating layer between the pixel electrode and the switching element, and wherein the second dummy patterns are in substantially the same layer as the organic insulating layer.

11. The display panel of claim 1, wherein the first base substrate further includes a first seal line region, and the first display substrate further comprises a first spread-blocking pattern in the first seal line region which corresponds to the curved corner of the sealing member, and having substantially the same curvature as the one of the first dummy patterns.

12. The display panel of claim 11, wherein the second base substrate further includes a second seal line region, and the second display substrate further comprises a second spread-blocking pattern in the second seal line region which corresponds to the curved corner of the sealing member, and having substantially the same curvature as the first spread-blocking pattern, wherein the second spread-blocking pattern is spaced apart from the first spread-blocking pattern by a predetermined distance in the plan view of the display panel.

13. The display panel of claim 11, wherein the first spread-blocking pattern is in substantially the same layer as the first dummy patterns.

14. The display panel of claim 1, wherein the curvature of the curved corner of the sealing member is substantially the same as that of the one of the first dummy patterns.

15. The display panel of claim 1, wherein the curvature of the curved corner of the sealing member is larger than that of the one of the first dummy patterns.

16. The display panel of claim 1, wherein the one of the second dummy patterns in the second peripheral region has a curvature different from the sealing member such that the one of the second dummy patterns surrounds the corresponding corner portion of the second display region.

17. The display panel of claim 16, wherein the curvature of the one of the second dummy patterns is substantially the same as that of the one of the first dummy patterns.

18. The display panel of claim 1, wherein the second dummy patterns of the second display substrate are elongated parallel to the first dummy patterns of the first display substrate facing the second display substrate, in the plan view of the display panel.

19. The display panel of claim 1, wherein a first length of the first straight portion and a second length of the second straight portion are less than about 1,000 micrometers.

20. The display panel of claim 1, wherein at the corresponding corner portions of the first and second base substrates, the first and second dummy patterns are spaced apart from each other in a thickness direction of the display panel.

21. A method of manufacturing a display panel, the method comprising:
  forming a first display substrate and a second display substrate each including:
    a base substrate including a display region having a plurality of corner portions, a peripheral region, and a seal line region which surrounds the peripheral region;
    a plurality of dummy patterns disposed on the base substrate and in the peripheral region, and
      an alignment layer in the display region and the peripheral region of the base substrate,
  wherein
    at corresponding corner portions of the base substrates of the first and second display substrates, the plural dummy patterns of the first display substrate do not overlap the plural dummy patterns of the second display substrate in a plan view of the display panel; and
    the plural dummy patterns of the first display substrate and the plural dummy patterns of the second display substrate are each defined by:
      a curved corner having a curvature and surrounding the corner portion of the display region of the respective base substrate;
      a first straight portion extending from a first end of the curved corner, along a first direction, and terminating a predetermined distance from the curved corner to be separated from an adjacent dummy pattern on the respective base substrate in the first direction; and
      a second straight portion extending from an opposing second end of the curved corner, along a second direction different from the first direction, and terminating a predetermined distance from the curved corner to be separated from an adjacent dummy pattern on the respective base substrate in the second direction;
  forming a sealing member on the first display substrate, the sealing member formed to include a curved corner; and
  assembling the first display substrate with the second display substrate, after the forming the sealing member,
  wherein the curved corner of one of the dummy patterns of the first display substrate and the curved corner of one of the dummy patterns of the second display substrate are between the curved corner of the sealing member, and the corresponding corner portions of the first and second display areas, respectively, in the plan view of the display panel.

22. The method of claim 21, wherein the forming the first display substrate further comprises:
  forming the dummy patterns in the peripheral region and a pixel spacer in the display region; and
  forming the alignment layer on the base substrate after the forming the dummy patterns and the pixel spacer.

23. The method of claim 21, wherein the forming the first display substrate comprises:
  forming a color filter layer in the display region and the peripheral region;
  patterning the color filter layer to form a color filter in the display region and the dummy patterns in the peripheral region; and
  forming the alignment layer on the base substrate after the forming the dummy patterns and the color filter.

24. The method of claim 21, wherein the forming the first display substrate comprises:
  forming a light-blocking layer in the display region and the peripheral region;
  patterning the light-blocking layer to form a light-blocking pattern and the dummy patterns, the light blocking pattern including a matrix portion in the display region and an outer portion in the peripheral region, the outer portion connected to the matrix portion, and the dummy patterns being a single unitary indivisible member with the outer portion; and
  forming the alignment layer on the base substrate after the forming the light-blocking pattern and the dummy patterns.

25. The method of claim 21, wherein the forming the first display substrate comprises:
  forming a switching element, a gate line and a data line in the display region, the switching element connected to the gate line and the data line;
  forming an organic insulating layer overlapping the switching element in the display region and the dummy patterns in the peripheral region;
  forming a pixel electrode on the base substrate after the forming the organic insulating layer, the pixel electrode electrically connected to the switching element; and
  forming the alignment layer on the base substrate after the forming the pixel electrode.

* * * * *